(12) United States Patent
Simons

(10) Patent No.: US 12,482,331 B2
(45) Date of Patent: *Nov. 25, 2025

(54) MANAGEMENT OF ELECTRONIC GAMING AND BETTING TRANSACTIONS USING A DISTRIBUTED MULTI-LEDGER GAMBLING ARCHITECTURE

(71) Applicant: AMERICORP INVESTMENTS LLC, Denver, CO (US)

(72) Inventor: Jordan Simons, Denver, CO (US)

(73) Assignee: Americorp Investments LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,859

(22) Filed: Mar. 18, 2024

(65) Prior Publication Data

US 2024/0304061 A1  Sep. 12, 2024

Related U.S. Application Data

(60) Continuation of application No. 17/715,769, filed on Apr. 7, 2022, now Pat. No. 11,961,366, which is a
(Continued)

(51) Int. Cl.
*G07F 17/32* (2006.01)
*G06F 21/32* (2013.01)
(Continued)

(52) U.S. Cl.
CPC .......... *G07F 17/3251* (2013.01); *G06F 21/32* (2013.01); *G07F 17/3223* (2013.01);
(Continued)

(58) Field of Classification Search
CPC ...................................................... G07F 17/32
See application file for complete search history.

(56) References Cited

U.S. PATENT DOCUMENTS 9,635,000 B1   4/2017  Muftic
9,749,140 B2   8/2017  Oberhauser et al.
(Continued)

FOREIGN PATENT DOCUMENTS

EP   3054405 A1   8/2016
WO  2015175854 A2  11/2015
(Continued)

OTHER PUBLICATIONS

Acheson, Noelle, "Macroeconomics, Gambling and Crypto: A Perfect Storm?," CoinDesk, 4 pages, Oct. 21, 2017.
(Continued)

*Primary Examiner* — Omkar A Deodhar
(74) *Attorney, Agent, or Firm* — KPPB Law; Luis M. Ortiz; Kermit D. Lopez

(57) ABSTRACT

Non-limiting examples of the present disclosure relate to creation and management of a transactional ledger through an electronic gaming application/service. Various embodiments relate generally to gaming systems based on a distributed multi-ledger gaming architecture. In accordance with various embodiments, a transparent technology platform can be used to provide a secure ledger system for recording value transfer, play action, bets, analytics, gaming statistics (e.g., payouts, skill levels, etc.), and the like. In some examples, gaming systems can directly interact with the distributed multi-ledger architecture for secure and transparent transactions which can also be accessed by auditors, tax authorities, partners, and/or other entities. Some examples may use private and/or public blockchains as part of the distributed multi-ledger gaming architecture. For instance, multiple distributed network nodes may be utilized to manage creation of game-related transaction records.

20 Claims, 16 Drawing Sheets

Related U.S. Application Data continuation of application No. 17/086,537, filed on Nov. 2, 2020, now Pat. No. 11,393,292, which is a division of application No. 16/819,763, filed on Mar. 16, 2020, now Pat. No. 10,825,295, which is a continuation of application No. 16/417,250, filed on May 20, 2019, now Pat. No. 10,593,157, which is a continuation of application No. 16/176,827, filed on Oct. 31, 2018, now Pat. No. 10,297,106.

(60) Provisional application No. 62/738,619, filed on Sep. 28, 2018, provisional application No. 62/616,247, filed on Jan. 11, 2018, provisional application No. 62/579,661, filed on Oct. 31, 2017.

(51) Int. Cl.
  *H04L 9/06* (2006.01)
  *H04L 9/32* (2006.01)
  *H04L 9/00* (2022.01)

(52) U.S. Cl.
  CPC ...... *G07F 17/3241* (2013.01); *G07F 17/3288* (2013.01); *H04L 9/0637* (2013.01); *H04L 9/0643* (2013.01); *H04L 9/3226* (2013.01); *H04L 9/3239* (2013.01); *H04L 9/50* (2022.05); *H04L 2209/56* (2013.01)

(56) References Cited

U.S. PATENT DOCUMENTS

| | | |
|---|---|---|
| 9,756,047 B1 | 9/2017 | Batchu et al. |
| 10,297,106 B1 | 5/2019 | Simons |
| 10,593,157 B2 | 3/2020 | Simons |
| 10,825,295 B2 | 11/2020 | Simons |
| 11,393,292 B2 | 7/2022 | Simons |
| 11,557,174 B2 | 1/2023 | Simons |
| 11,961,366 B2 | 4/2024 | Simons |
| 2007/0255653 A1 | 11/2007 | Tumminaro et al. |
| 2008/0234047 A1 | 9/2008 | Nguyen |
| 2012/0210120 A1 | 8/2012 | Irvine |
| 2013/0065670 A1 | 3/2013 | Michaelson et al. |
| 2015/0164192 A1 | 6/2015 | Gross |
| 2015/0310476 A1 | 10/2015 | Gadwa |
| 2015/0356523 A1 | 12/2015 | Madden |
| 2015/0364004 A1 | 12/2015 | Allen et al. |
| 2016/0008723 A1 | 1/2016 | Thompson et al. |
| 2016/0012465 A1 | 1/2016 | Sharp |
| 2016/0217532 A1 | 7/2016 | Slavin |
| 2016/0224949 A1 | 8/2016 | Thomas et al. |
| 2016/0260169 A1 | 9/2016 | Arnold et al. |
| 2016/0292680 A1 | 10/2016 | Wilson, Jr. et al. |
| 2017/0011460 A1 | 1/2017 | Molinari et al. |
| 2017/0084118 A1 | 3/2017 | Robinson et al. |
| 2017/0140605 A1* | 5/2017 | Lewski ............... G07F 17/3288 |
| 2017/0309117 A1 | 10/2017 | Clemenson et al. |
| 2018/0018855 A1 | 1/2018 | Riggs |
| 2018/0121911 A1 | 5/2018 | Hallam et al. |
| 2019/0130698 A1 | 5/2019 | Simons |
| 2019/0295371 A1 | 9/2019 | Simons |
| 2020/0219362 A1 | 7/2020 | Simons |
| 2021/0174641 A1 | 6/2021 | Simons |

FOREIGN PATENT DOCUMENTS

| | | |
|---|---|---|
| WO | 2015183497 A1 | 12/2015 |
| WO | 2016032567 A1 | 3/2016 |

OTHER PUBLICATIONS

Ben-Sasson, Eli et al., "Zerocash: Decentralized Anonymous Payments From Bitcoin," 2014 IEEE Symposium on Security and Privacy, pp. 459-474, May 18-21, 2014.

Bitcoin, "Bitcoin Developer Reference," http:/bitcoin.org/en/developer-reference, 250 pages, Oct. 29, 2018.
BlockGeeks, "What Is Blockchain Technology? A Step-By-Step Guide for Beginners," https://web.archive.org/web/20170103030405/https://blockgeeks.com/guides/what-is-blockchain-technology, 1 page, Jan. 3, 2017.
Bonneau, Joseph et al., "SoK: Research Perspectives and Challenges for Bitcoin and Cryptocurrencies," 2015 IEEE Symposium on Security and Privacy, 18 pages, May 17-21, 2015.
Church, Zach, "Blockchain, Explained," MIT Sloan School of Management, 7 pages, May 25, 2017.
Cocco, Sharon et al., "Top 6 Technical Advantages of Hyperledger Fabric for Blockchain Networks," IBM, 8 pages, Mar. 18, 2018.
Dinkins, David, "ICO to Build Next Generation AI Raises $36 Million In 60 Seconds," Cointelegraph, 3 pages, Dec. 23, 2017.
Evangelho, Jason, "New Blockchain-Powered Android Console Brings Tabletop Gaming to Life," Forbes Media LLC, 6 pages, Mar. 14, 2018.
Greenspan, Gideon, "Why Many Smart Contract Use Cases are Simply Impossible," CoinDesk, 9 pages, Apr. 17, 2016.
International Application No. PCT/US2018/058484, International Search Report and Written Opinion, 11 pages, Jan. 23, 2019.
International Application No. PCT/US2018/058491, International Search Report & Written Opinion, 10 pages, Feb. 19, 2019.
Kate, "How Blockchain Technology Will Change Global Payments," Let's Talk Payments LLC, 4 pages, Aug. 16, 2016.
Kosba, Ahmed, "Hawk: The Blockchain Model of Cryptography and Privacy-Preserving Smart Contracts," 2016 IEEE Symposium on Security and Privacy, 31 pages, May 22-26, 2016.
Nakamoto, Satoshi, "Bitcoin: A Peer-To-Peer Electronic Cash System," Bitcoin, Oct. 2008.
Narayanan, Arvind et al., "Bitcoin and Cryptocurrency Technologies," Princeton University Press, 308 pages, Feb. 9, 2016.
OpenMined, "Building Safe Artificial Intelligence," https://web.archive.org/web/20180803133315/https://www.openmined.org/, 20 pages, Aug. 3, 2018.
Peck, Morgen E., "Blockchains: How They Work and Why They'll Change The World," IEEE Spectrum, 8 pages, Sep. 28, 2017.
Prisco, Giulio, "A Quantum Blockchain 'Time Machine' Could Keep Future Blockchains Secure," Bitcoin Magazine, 7 pages, May 2, 2018.
Read The Docs, Inc., "Read The Docs," https://web.archive.org/web/20181024090027/https://hyperledger-fabric.readthedocs.io/en/release/, 2 pages, Oct. 24, 2018.
Sammantics, "The Trend Towards Blockchain Privacy: Zero Knowledge Proofs," http://sammantics.com/blog/2016/8/23/the-trend-towards-privacy-how-blockchains-plan-to-accomplish-this, 11 pages, Sep. 6, 2016.
Stanford, "CS 251: Bitcoin and Cryptocurrencies Course Syllabus and Readings," https://web.archive.org/web/20180911051638/http://crypto.stanford.edu/cs251/syllabus.html, 3 pages, Sep. 11, 2018.
The Economist Newspaper Limited, "The Great Chain of Being Sure About Things," http://www.economist.com/news/briefing/21677228-technology-behind-bitcoin-lets-people-who-do-not-know-or-trust-each-other-build-dependable, 4 pages, Oct. 31, 2015.
Wikipedia, "Blockchain," http://en.wikipedia.org/wiki/Blockchain, 13 pages, Oct. 21, 2018.
Wikipedia, "Secure Multi-Party Computation," http://en.wikipedia.org/wiki/Secure_multi-party_computation, 7 pages, Oct. 7, 2018.
Wikipedia, "Zero-Knowledge Proof," http://en.wikipedia.org/wiki/Zero-knowledge_proof, 8 pages, Aug. 1, 2018.
Xorbin, "SHA-25 Hash Calculator," https://web.archive.org/web/20180921110518/https://www.xorbin.com/tools/sha256-hash-calculator, 3 pages, Sep. 21, 2018.
U.S. Appl. No. 17/086,537, Information Disclosure Statement by Applicant, Nov. 20, 20220.
U.S. Appl. No. 16/819,763, Information Disclosure Statement by Applicant, Mar. 16, 2022.
U.S. Appl. No. 16/819,763, Information Disclosure Statement by Applicant, Jul. 2, 2020.
U.S. Appl. No. 16/417,250, Information Disclosure Statement by Applicant, May 20, 2019.
U.S. Appl. No. 16/417,250, References Cited, Jul. 3, 2019.

(56) References Cited

OTHER PUBLICATIONS

U.S. Appl. No. 16/176,827, Information Disclosure Statement by Applicant, Jan. 21, 2019.
U.S. Appl. No. 16/176,827, Information Disclosure Statement by Applicant, Feb. 8, 2019.
U.S. Appl. No. 16/176,827, Information Disclosure Statement by Applicant, Mar. 11, 2019.
U.S. Appl. No. 17/092,415, Notice of Allowance, Sep. 15, 2022.
U.S. Appl. No. 17/092,415, Non-final Office Action, May 22, 2022.

* cited by examiner

| TRANS. ID | PLAYER ID | AMOUNT | CONDITION | LOCATION ID | PAYOUT | OTHER (E.G., EXECUTABLES) |
|---|---|---|---|---|---|---|
| | | | | | | |
| | | | | | | |
| | | | | | | |
| | | | | | | |
| | | | | | | |
| | | | | | | |
| | | | | | | |
| | | | | | | |
| | | | | | | |

| Games | Poker |
|---|---|

| Quick Seat | Cash Games | Tournaments |

1,247 Players seated at 397 tables

| 1. Select Game | 2. Select Limit | 3. Select Game Type | 4. Select Stakes |
|---|---|---|---|
| Texas Hold 'Em | No Limit | Cash Game | $0.10 / $0.25 |
| Omaha | Pot Limit | Sit and Go | $1 / $2 |
| Stud | Limit | | $5 / 10 |

| Your Balance $0 | Deposit | Cash Out | 0 My Games |

Poker Lobby

| Table | Stakes | Type | Players | Join | ETC . . . |
|---|---|---|---|---|---|
| Table 1 | $1/$2 | PL | 6/9 | Join | |
| Table 2 | $5/$10 | NL | 9/9 | | |
| ETC ... | | | | | |

9-Ball (One-on-One) - Lobby

| Table | Stakes | Players | Play | ETC . . . |
|---|---|---|---|---|
| Table 1 | $1 | 412 | Play | |
| Table 2 | $5 | 983 | Play | |
| ETC ... | | | | |

Sudoku Lobby

| Table | Stakes | Type | Players | Join | ETC . . . |
|---|---|---|---|---|---|
| Table 1 | $1 | PL | 1/2 | Join | |
| Table 2 | $2 | NL | 9/9 | | |
| ETC ... | | | | | |

Halo 3 - Lobby

| Players | Games Played | Rank/Level | Wins | Challenge | ETC . . . |
|---|---|---|---|---|---|
| Player 1023 | 187 | 9 of 10 | 170 | Challenge | |
| Player 2289 | 23 | 2 of 10 | 10 | Challenge | |
| EtC ... | | | | | |

ETC
·
·
·

FIG. 13

MANAGEMENT OF ELECTRONIC GAMING AND BETTING TRANSACTIONS USING A DISTRIBUTED MULTI-LEDGER GAMBLING ARCHITECTURE

RELATED APPLICATIONS

This application is a continuation of U.S. patent application Ser. No. 17/715,769, filed Apr. 7, 2022, now allowed. U.S. patent application Ser. No. 17/715,769 is a continuation of U.S. patent application Ser. No. 17/086,537, filed Nov. 2, 2020, now issued as U.S. Pat. No. 11,393,292 on Jul. 19, 2022; which is a divisional of U.S. patent application Ser. No. 16/819,763 filed on Mar. 16, 2020, and issued as U.S. Pat. No. 10,825,295 on Nov. 3, 2020; which is a continuation of U.S. patent application Ser. No. 16/417,250 filed on May 20, 2019, and issued as U.S. Pat. No. 10,593,157 on Mar. 17, 2020; which is a continuation of U.S. patent application Ser. No. 16/176,827 filed on Oct. 31, 2018, and issued as U.S. Pat. No. 10,297,106 on May 21, 2019; which claims the benefit of and priority to U.S. Provisional Patent Application No. 62/579,661 filed on Oct. 31, 2017, U.S. Provisional Patent Application No. 62/616,247 filed on Jan. 11, 2018, and U.S. Provisional Patent Application No. 62/738,619 filed on Sep. 28, 2018, all of which are hereby incorporated by reference in their entirety for all purposes.

TECHNICAL FIELD

Various embodiments of the technology relate generally to gaming systems. More specifically, some embodiments of the technology relate to systems and methods for a distributed multi-ledger gambling architecture.

BACKGROUND

Gaming systems/services manage ledgers and books to keep transactional records. For instance, gaming systems/services enable users to execute bets through a gaming environment. However, bets can be difficult to track through execution, especially in instances where a long period of time lapses between the time when a bet is created and when an outcome is determined. This can make wagers more susceptible to having issues such as records being lost or instances where electronic records are hacked and tampered with. Additionally, records for gaming applications/services are typically stored in a centralized database, greatly increasing the risk of data loss and financial loss via a data hack.

Other technical shortcomings of traditional gaming applications/services include limited user interfaces, where traditional gaming user interfaces limit users on the types of bets that can be entered (e.g., money wagers in a blackjack or poker application). Traditional gaming applications/services do not allow users to enter customized bets enabling users to customize: wagers (e.g., physical goods, virtual goods); conditions, parameters associated with the bet; and/or selecting various means of validation, among other examples. For maintaining ledgers of transactional activity, such traditional practices may also lead to less accurate transactional records that do not adequately reflect the nature of a specific bet.

SUMMARY

In view of the foregoing technical shortcomings, non-limiting examples of the present disclosure relate to creation and management of a transactional ledger through an electronic gaming application/service. Various embodiments of the technology relate generally to gaming systems, where some embodiments relate to gaming systems and methods based on a distributed multi-ledger gaming architecture. In accordance with various embodiments, a transparent technology platform can be used to provide a secure ledger system for recording money transfer, play action, bets, analytics, gaming statistics (e.g., payouts, skill levels, etc.), and the like. In some examples, gaming systems can directly interact with the distributed multi-ledger architecture for secure and transparent transactions which can also be accessed by auditors, tax authorities, partners, and/or other entities. Some examples may use private and/or public blockchains as part of the distributed multi-ledger gaming architecture. For instance, multiple distributed network nodes may be utilized to manage creation of transaction records.

BRIEF DESCRIPTION OF THE DRAWINGS

A further understanding of the nature and advantages of the present technology may be realized by reference to the remaining portions of the specification and the drawings wherein like reference numerals are used throughout the several drawings to refer to similar components. Further, various components of the same type may be distinguished by following the reference label with a dash and a second label that distinguishes among the similar components. If only the first reference label is used in the specification, the description is applicable to any one of the similar components having the same first reference label irrespective of the second reference label.

Embodiments of the present technology will be described and explained through the use of the accompanying drawings as follows.

FIG. 9 illustrates an example of information that may be recorded in a multi-ledger system in accordance with one or more embodiments of the present technology.

FIG. 11 illustrates an example of a graphical user interface that may be used for selecting options to identify suitable games in accordance with various embodiments of the present technology.

FIG. 13 illustrates various examples of graphical user interfaces showing lobbies for various games according to some embodiments of the present technology.

Figure 1:
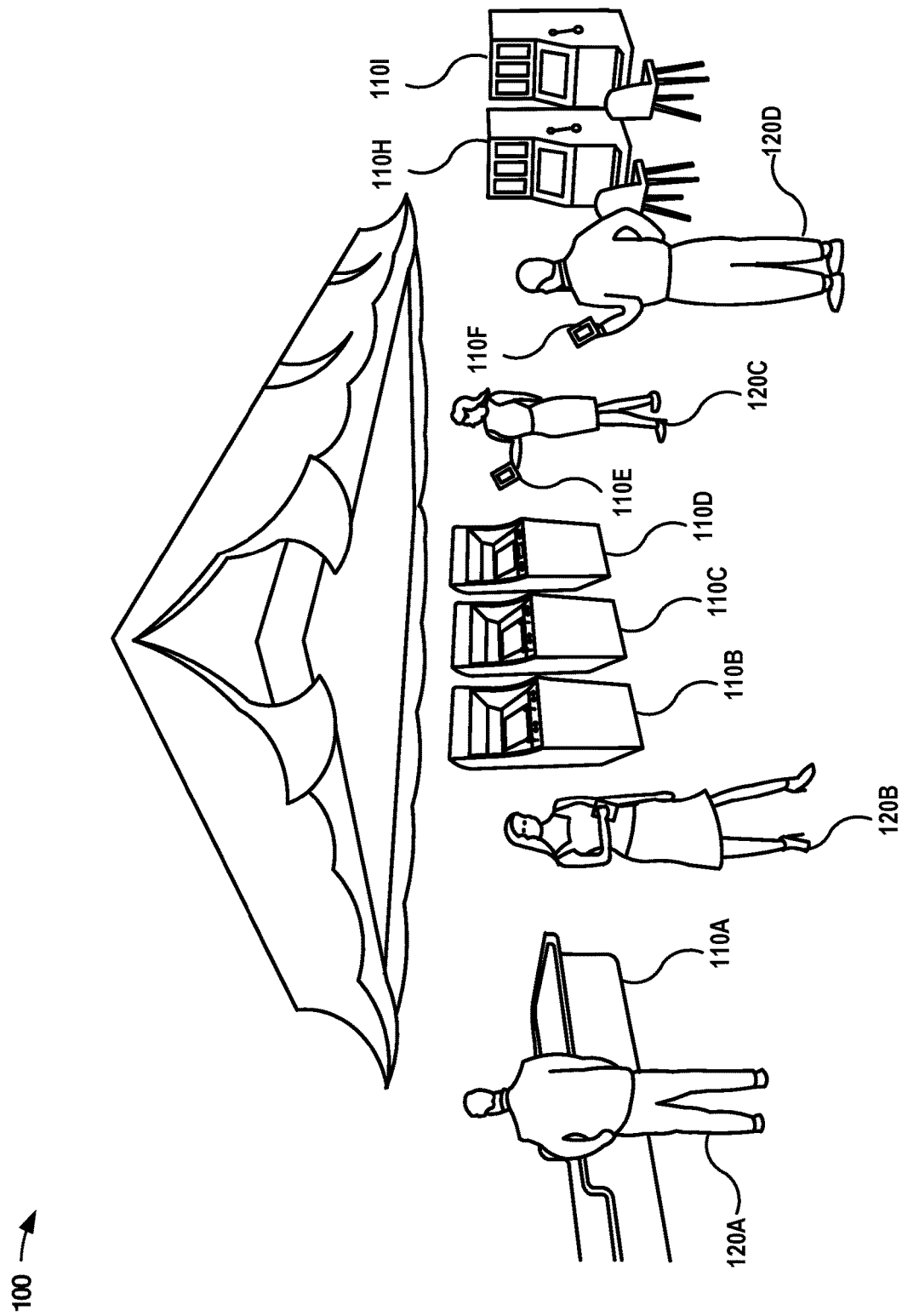
FIG. 1 illustrates an environment where an interactive gaming system with a distributed multi-ledger architecture can be used according to some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Non-limiting examples of the present disclosure relate to creation and management of a transactional ledger through an electronic gaming application/service. Various embodiments of the technology relate generally to gaming systems. More specifically, some examples of the technology relate to gaming systems and methods based on a distributed multi-ledger gaming architecture. A multi-ledger gaming architecture implements a secure ledger system that is accessible over a network connection (e.g., distributed network connection). The secure ledger system may comprise one or more ledgers for transactional management of data associated with a gaming platform. In accordance with various embodiments, a transparent gaming platform can be used to provide a secure ledger system for recording money transfer, play action, bets, analytics, gaming statistics (e.g., payouts, skill levels, etc.), and the like. In some embodiments, gaming systems can directly interact with the distributed multi-ledger architecture for secure and transparent transactions which can also be accessed by auditors, tax authorities, partners, and/or other entities. Some examples may use private and/or public blockchains as part of the distributed multi-ledger gaming architecture. For instance, various transactions or other information such as bets, money transfers, records of game play (game play data), digital currency, loyalty information, avatars, bots, game states, jackpot amounts, and other transactions may be recorded on the blockchain. In some instances, executable code (e.g., code written in Python, Pascal, C, C++, C#, Java, etc.), may be stored in the ledger that allows the gaming system to retrieve the most recent version of an electronic game. The blockchain can provide a chronological recording of these various transactions or code in a ledger that can be distributed across multiple nodes of the network. As such, these nodes can each keep a copy of the transactions or code.

A gaming platform may maintain a ledger for a specific type of gaming application/service, where a ledger may be created for a specific game or alternatively pertain to multiple different games. In instances where ledgers are maintained for individual games, a gaming platform may maintain multiple ledgers for a plurality of games. Separate ledgers may also be created for different types of gaming transactions occurring through a gaming platform. In some embodiments, the ledger can be used to create, record, and enforce customized bets between multiple parties (e.g., two or more parties). For example, if two parties would like to bet on an event, this bet can be recorded within the ledger. The participants can agree on wager, outcome conditions, validation source, rules, and other conditions or parameters. In some embodiments, the ledger may include code snippets that when executed evaluate the outcome and automatically transfer money as set forth with the conditions of the bet. By writing the wagering amounts, rules, outcomes, verification details, and the like into the ledger (e.g., a block in a blockchain) the bet can be tracked and verified.

Exemplary technical advantages provided by processing described in the present disclosure including but are not limited to: generation and management of customized transactions executed through a gaming application/service; improved electronic record keeping for varying types of gambling transactions; an improved graphical user interface for gaming applications/services to foster better management of customized transactions executed through a gaming application/service; improved security for system and services examples including management of transactions through a gaming application/service; reduction in computational complexity and computing resources (e.g., physical computing devices and storage devices) necessary to validate transactions through a gaming application/service; an exemplary consensus evaluation that provides a consolidated and consistent dataset with reduced errors for in transaction recordation, improved transparency in data access transactions through implementation of blockchain ledgers; improving resource tracking including the tracking and management of virtual goods (e.g., skins, crates, etc.) associated with a gaming application/service; and improved processing efficiency (e.g., better resource management) for management of transactions of a gaming application/service, among other examples.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to interactive gaming and customized betting on various devices, embodiments of the present technology are equally applicable to various other cloud-based gaming technologies.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an environment where an interactive gaming system with a distributed multi-ledger architecture can be used according to some embodiments of the present technology. As illustrated in FIG. 1, gaming terminals 110A-110D (e.g., mobile devices, gaming cabinets, table tops, etc.) can be used by players 120A-120D as player terminals and can allow various types of games to be played within a casino, local property, or other location. Various embodiments of the present technology allow for a variety of electronic games including, but not limited to, networked games, interactive games, games of skill, sports betting, customized betting, and the like. For example, in some embodiments, players may engage in games of chance or in interactive games that require at least one player decision after the game has begun. The decisions and interactions within the interactive games can directly affect the outcome of the game. Interactive games can include games of skill, games of chance and/or hybrid games that mix games of chance and games of skill. Examples of interactive games include, but are not limited to, poker, blackjack, video and arcade games, virtual reality games, eSports, live dealer, pinball, games of chance with bonus rounds that include games of skill, and others. The interactive games can include head-to-head games where one player or team of players compete directly against another player or team of players. In some embodiments, the interactive game may be a single player game where the player is trying to meet various objectives (e.g., score a desired number of points, reach a certain level, complete a screen within a limited time frame, beat a computerized player, and the like).

While not illustrated in FIG. 1, gaming terminals 110A-110D can include a game display area, touch screen interfaces, buttons, joysticks, actuators, biometric sensors, cameras, jackpot payout information areas, player interaction areas, cash and credit interaction areas and/or other components or areas for displaying information or receiving inputs from players 120. For example, a game display area can provide a visual depiction of the game in which the player is involved. As another example, a jackpot payout information area can display information about the status of jackpot accumulations. The amounts associated with the various jackpots may increase with time and may be game specific. For example, if the player terminal provides the possibility to engage in different types of games and limits, then the jackpot amounts displayed in the jackpot information area may change with different player game selections.

Some embodiments allow the gaming platforms 110A-110N to utilize a distributed multi-ledger gaming architecture to create a secure ledger system for recording money transfer, play action, bets, gaming statistics (e.g., payouts, skill levels, etc.), code, and the like. In some embodiments, gaming platforms 110A-110N can directly interact with the distributed multi-ledger architecture for secure and transparent transactions which can also be accessed by auditors, tax authorities, partners and/or other entities. Some embodiments may use private and/or public blockchains as part of the distributed multi-ledger gaming architecture. For example, various transactions or other information such as bets, money transfers, records of game play, digital currency, loyalty information, avatars, game states, jackpot amounts, and other transactions may be recorded on the blockchain. In some embodiments, executable code may be stored in the ledger that allows the gaming system to retrieve the most recent version of the game. The blockchain can provide a chronological recording of these various transactions or code in a ledger that can be distributed across multiple nodes of the network. As such, these nodes can each keep a copy of the transactions or code, which is accessed and updated in a decentralized manner.

In some embodiments, the distributed multi-ledger architecture can be used to create, record, and enforce customized bets between multiple parties (e.g., two or more parties). For example, if two parties would like to bet on an event, this bet can be recorded within the ledger. The participants can agree on wager, outcome conditions, validation source, rules, and other conditions or parameters to create a customized bet. In some embodiments, the ledger may include code snippets that when executed evaluate the outcome and automatically transfer money as set forth with the conditions of the bet. By writing the wagering amounts, rules, outcomes, verification details, and the like into the ledger (e.g., a block in a blockchain) the bet can be tracked and verified.

Figure 2:
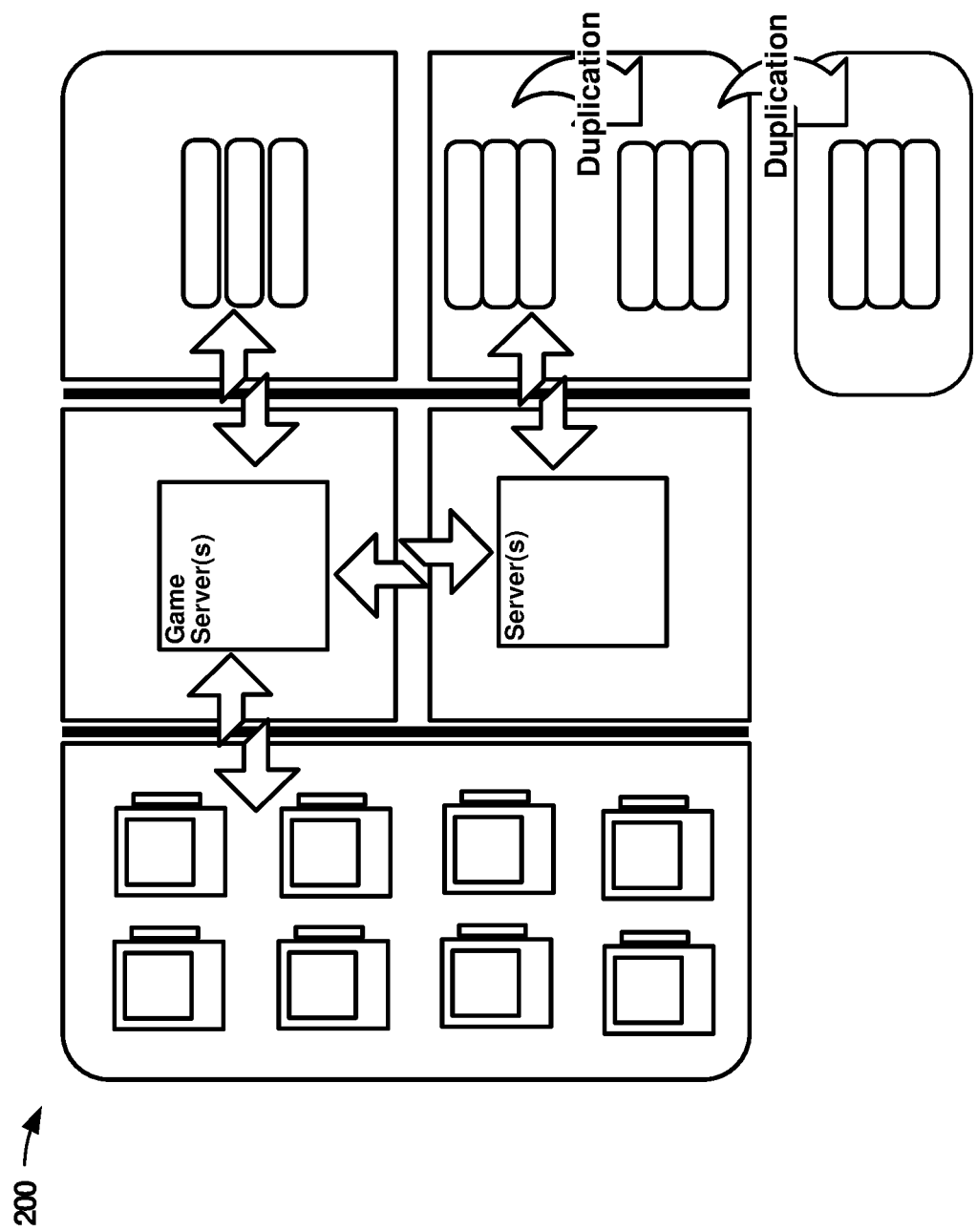
FIG. 2 is a block diagram illustrating a distributed multi-ledger gaming architecture that may be used according to embodiments of the present technology.

FIG. 2 is a block diagram illustrating a distributed multi-ledger gaming architecture that may be used according to embodiments of the present technology. In accordance with various embodiments, the distributed multi-ledger gaming architecture provides a secure ledger system for recording money transfer, play action, bets, analytics, gaming statistics (e.g., payouts, skill levels, etc.), and the like. In some embodiments, servers can retrieve and store information in a distributed ledger that is duplicated multiple times at different nodes.

The gaming architecture illustrated in FIG. 2 can allow for a variety of gaming activity including, customized betting using smart contracts, peer to peer play, skill-based games, augmented reality games and/or betting, virtual reality games, traditional casino games, arcade games, video games, and others. Peer to Peer and Skill-based games allow users to compete against each other for money either in a direct one on one manner or in a non-direct multiplayer tournament environment. This style of gaming differs from traditional gambling in that the results are somewhat determined by the actions of each player relative to the actions of the other player(s). The results are not 100% predetermined by a computer or randomly generated from slot machine. In a traditional casino game, either the player wins or the casino wins. Some embodiments of the gaming architecture the casino can take a rake or processing fee for each game.

Various embodiments of the gaming architecture provide for an open, scalable, and flexible Peer to Peer/Skill-based gaming platform that allows for wagering (e.g., real money, virtual currencies, etc.). In some embodiments, the system may limit certain types of game play so legal gaming jurisdictions like Nevada, Indian reservations and international markets.

Some embodiments use a peer to peer matching engine to provide a simple and intuitive interface for finding, negotiating with, and playing against other players. This functionally can be self-contained and accessible via an API that will allow for the production of custom built end-user interfaces to utilize currently deployed equipment on the casino floor, wireless handheld devices, kiosks, tablets, computers, gaming cabinets, set-top boxes, interactive and smart TVs, and other client devices. The interfaces can be easily customized for visual consistency with existing framework. The platform can also be dynamically adjusted for localization requirements such as language, currency, and local rules.

Some embodiments allow an individual player the ability to challenge another individual player in a heads up 1-on-1 (Peer to Peer) match where the competitive environment could include games. The games could be anything from Poker to War to Chess to Madden Football. The players can negotiate with each other, through some embodiments of the platform, on how much money to play for, before the players actually play the game. Once the agreed upon wager has been determined, each players account is debited the agreed upon wager, or cash money is deposited into the machine "Cash In" device as the form of payment for the match. The players play the game and once the game is over and a winner has been determined, the winners account is credited with the wagered amount minus the house transaction/processing fee. Additionally, the players could receive a "Ticket Out" coupon for their remaining balance that can be turned in for cash. These two players can have a rematch or return to the lobby of this game, on our platform, to find another player to challenge in either the same game or choose a different game.

An alternative method for providing a heads up 1-on-1 (Peer to Peer) match would be for a player to predetermine and specify his/her "Match" conditions. These conditions could be posted for other players to view and accept if agreeable. Additionally, the posting player could specify that they are agreeable to modifications of their conditions. This method while still allowing for customized conditions of matches also provides a quicker path to a match than the fully negotiated process. With tournaments, various embodiments of the system can allow the players to play the game, but not necessarily in a heads up 1-on-1 (Peer to Peer) fashion, but as a single player trying to get the best score possible. Tournament style of play allows the players the ability to come to play the games without having to challenge other players to a match and negotiate a fee. Tournament style of play additionally allow for an added dynamic of a "Many vs. Many" environment, which provides many additional options for payouts and Tournament types.

The clients illustrated in FIG. 2, may include hardware modes that reduce or simplify network communication, animations, sounds and graphic detail to provide smooth interaction in any computing environment. Some embodiments provide for a thin client that is designed to maintain minimal logic in the client. Precise visual and functional control of the user interface in real-time is possible without ever needing to redistribute or reinstall client software. From changing fonts, colors and button functions to adding new games, almost any element of the client experience can be managed instantly from the server. Colors, fonts, background images and even sounds within the client can be customized for (or by) an operator, a given machine or bank of machines, location of a mobile device, etc.

Figure 3:
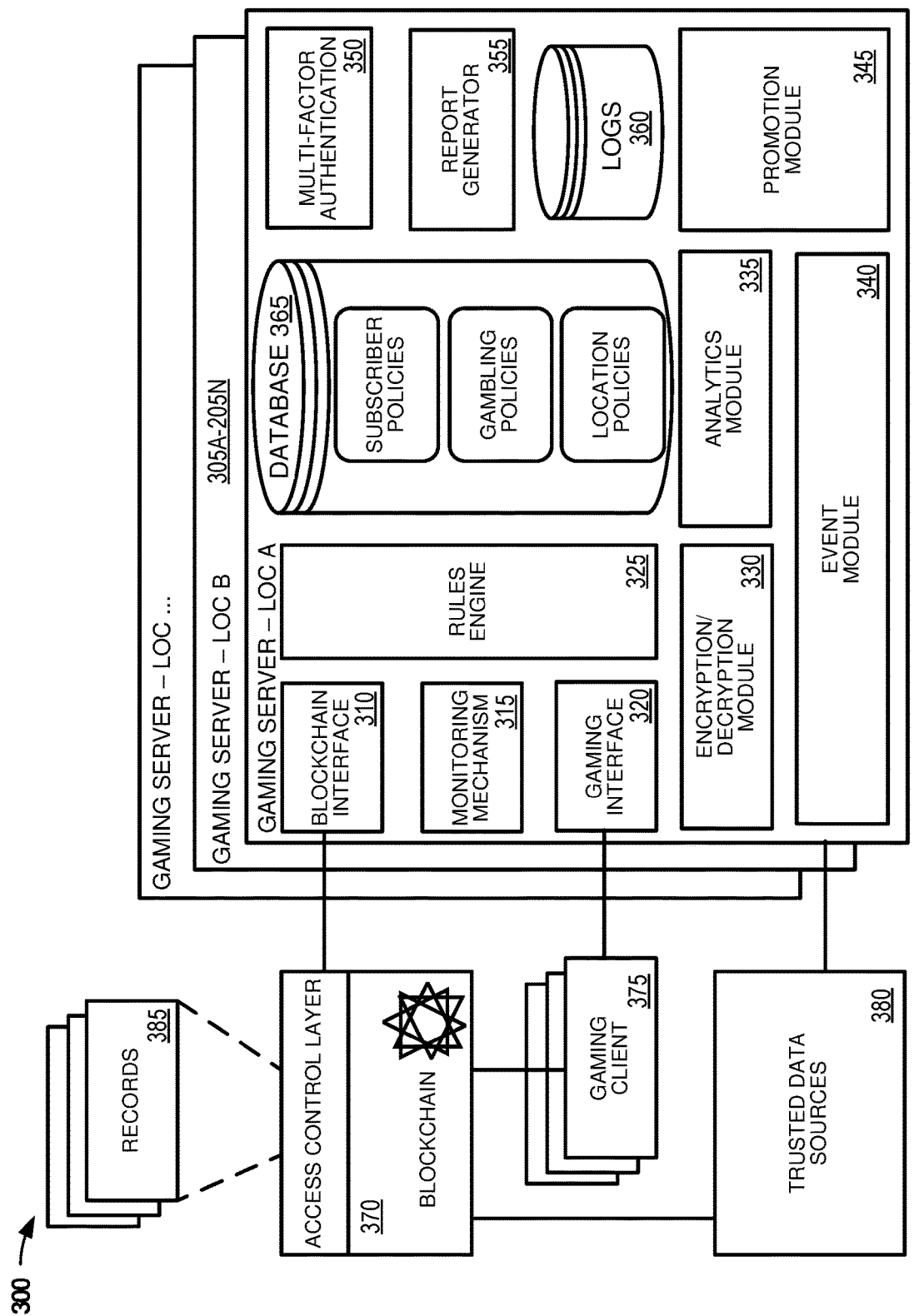
FIG. 3 illustrates various components of a skill-based gaming architecture utilizing a distributed multi-ledger architecture according to various embodiments of the present technology.

FIG. 3 illustrates various components of a gaming platform utilizing a distributed multi-ledger architecture according to various embodiments of the present technology. As illustrated in FIG. 3, the gaming platform may use one or more gaming servers 305A-305N. Each gaming server can include blockchain interface 310, monitoring mechanism 315, gaming interface 320, rules engine 325, encryption/decryption module 330, analytics module 335, event module 340, promotion module 345, multifactor authentication module 350, report generator 355, and/or databases 360 and/or 365 for storing logs, subscriber policies, gaming policies, location policies, and/or the like. In addition, gaming servers 305A-205N can connect with blockchain 370, gaming clients 375 (i.e., gaming terminals), trusted data sources 380, and/or records 385. Each of these modules, components, or databases can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, databases, and/or components. Still yet, some embodiments may incorporate two or more of these modules and components into a single module and/or associate a portion of the functionality of one or more of these modules with a different module. For example, in one embodiment, rules engine 325 and event module 340 can be combined into a single module for identifying and enforcing various rules and event policies on a gaming client 375.

Gaming clients 375 may connect to a gaming server 305A-305N using gaming interface 320. Gaming clients may be able to download (or have preinstalled) firmware or software from the gaming server that allows the gaming clients to play one or more games. Types of games that may be accessed through a gaming interface (e.g., gaming interface 320) comprise but are not limited to: role playing games (RPGs); real-time strategy (RTS) games; multiplayer online games (including massive multiplayer online games); battle royale games; first person shooter games; browser games; player versus player games; player versus environment games; games of skill; and games of chance, among other types of games. Non-limiting examples of such games may comprise a variety of games (e.g., Texas Hold'em, 7-Card Stud, Omaha, Draw poker, 2-7 lowball, Blackjack, Bridge, pinball, Grand Theft Auto, Tetris, Minecraft, Hearthstone, Super Mario, Super Mario Kart, Pac-Man, Guitar Hero, Galaga, League of Legends, Frogger, StarCraft, Donkey Kong, words with friends, Sonic the Hedgehog, Counter-Strike, Metroid, Ms. Pac-Man, Space Invaders, Punch-Out, Rainbow Six Siege, Fallout, Final Fantasy, Call of Duty, Street Fighter, Dota, Journey, Dark Souls, role playing games, decision based games, etc.) and a variety of limits ($0.25/$0.50, $11$2, $11$2 Blind No Limit, $10/$20, $500/$1000, etc.).

In some embodiments, the players may be able to select the game played in the gaming session and a game of skill to be played in the bonus round. The game session may be a tournament, which may be a single-table tournament or a multi-table tournament. The games may allow for peer-to-peer play or allow for customized betting on external events (e.g., sports, weather, elections, etc.).

In some embodiments the games may also include augmented reality games and/or virtual reality games. Transactional data related to wagers may be stored in block chain ledgers. Examples of wagers comprise but are not limited to: unique prizes, game-specific points, currency (physical and digital), virtual goods and digital goods (e.g., skins, crates, digital trading crates, etc.), rewards, clues, points, power-ups, videos, character modifications, recordings, or other collectibles, data, among other examples. Pending transactional data, digital wallets, funds, wagers, etc., may be accessible through a player account associated with a gaming platform. In other examples, transaction data may be accessible through a player terminal when the player terminal is at a particular physical location and/or when certain conditions are met (e.g., the player completes a certain task). As such, blockchain 370 may track how many times they have been accessed and then deny or restrict future access or change the access criteria (e.g., randomly associating the record access with a new location, time, event, etc.). The distributed ledger can be used to keep track of locations a player has visited or records of which players have visited a specific location (e.g., a geo-located area). As a result, elements of a virtual world, visits, access, and other information can be tracked on an auditable trail on the distributed ledger (e.g., block chain 370). In some embodiments, a third-party repository may payout prizes or bets identified within a private blockchain.

The software may require a connection to a gaming server (e.g., using gaming interface 320) each time a game is played or a connection within a specific time period (e.g., one week). In some embodiments, the gaming server may manage or host the game. In other embodiments, gaming clients 375 may run the games independently and report activity back to a gaming server. The gaming client can record various activity (e.g., bets, gaming action, user inputs, etc.) which can be stored on a distributed multi-ledger platform such as block chain 370. Blockchain 370 may be a private, public, hybrid, and/or semi-private platform that can be accessed by gaming servers 305 via blockchain interface 310. A hybrid blockchain runs on the open internet and is accessible to anyone like a public blockchain, but the hybrid blockchain uses a smaller set of validators and is more targeted towards a specific use case like a private blockchain. The information stored in blockchain 370 may be encrypted using encryption/decryption module 330.

In some embodiments, encryption/decryption module 330 may use various nonhomomorphic encryption and/or homomorphic encryption. While the nonhomomorphic encryption may provide stronger security properties, the use of homomorphic encryption would allow computation on encoded data without decryption. As a result, various components of the gaming system can interact and operate on portions of the data without exposure of sensitive data. Other embodiments may use multiple levels of authentication and trust to either retrieve or add data to the system. For example, gaming terminals within a casino that are under a stricter control may have a greater trust level and have the ability to add and/or retrieve more from blockchain 370. Similarly, remote gaming terminals (e.g., user devices) may have a lower trust level that requires additional authentications (e.g., operating system verifications, application verifications, user verifications, and the like) before information can be added to or retrieved from the blockchain.

Certain information may be available to all users, while other information may have higher trust or verification requirements. In some embodiments, individuals, machines, third-parties, etc. can have different access levels. For example, an auditor may be allowed to view all player information, casino information (e.g., profits, employee information), know-your-customer (KYC) information, anti-money-laundering (AML) information, tax information, and the like. As another example, a manager of a casino, an executive team, higher level management, or certain regulators or auditors that are overseeing a player may be granted access to KYC and AML information, but not other information stored on the multi-ledger system. A person responsible conducting a tournament, for example, will not be able to see this information and may instead on get summary or aggregated information regarding the tournament (e.g., number of players, jackpot amount, etc.). Tournament players, for example, may only be able to see pictures or confirmation of matches of a biometric data. Similarly, other players may only be able to see advertised play rates that are retrieved from the ledger.

In some embodiments, the system may include a master blockchain that records all of the available information. Portions of the information may be combined or duplicated to additional blockchains that allow access to different third-parties. For example, some embodiments may scrub personal identifying information and publish certain information (e.g., game payout rates) that are accessible to anyone while a second blockchain that is private may include not only game payout rates, but the raw underlying data that is needed by a regulator to validate the payout rates. Some embodiments may partition the blockchain into different segments that allow access (e.g., read and/or write) based on differing privileges and/or trust levels (e.g., different levels for IRS, pit boss, etc.).

Some embodiments allow data to be shared between auditors, casinos, banks, and the like. The specific type of information to be shared can be customized and set using various permissions and access control layers. For example, party information, escrow data, deal data, and the like can be shared on a hybrid ledger, but may not be visible on the private ledger (e.g., block chain). Regulators and auditors can see the full transaction details to make sure they are legally compliant and reporting properly. Part of the information could be on public blockchain to allow players to see published payout rate and feel like they are being treated fairly. Payouts may be visible on the public blockchain without any personal identifying information. This data could be retrieved and viewed by various systems or players. Some embodiments may use cashless wagering. Amount of money or value on account or card would be on the private blockchain along with and biometric/password/pin and bank account, balance, etc. Some other info (e.g., nickname) may be on a public blockchain. A reservation does not need access to credit card on private blockchain to make the reservation, but instead uses the public blockchain information and then credit card data can be accessed for payment from the private blockchain to pay for dinner. Monitoring mechanism 315 can monitor game play and player activities. This can include receiving information from external sources such as, but not limited to, gaming clients 375, video surveillance systems, loyalty card systems, key engines, biometric sensors, and other external systems. For example, in some embodiments, monitoring mechanism 315 can collect information regarding use of hotel room keys and/or loyalty cards to determine movement patterns within the casino. This information collected, aggregated, and/or analyzed to look for collusion, cheating, gaming preferences, gaming patterns, and the like.

In some embodiments, multifactor authentication may be used before allowing a player to access a game, access or transfer funds, and/or place bets. For example, when a player accesses a gaming terminal and desires to enter a wager (e.g., using cashless wagering, cryptocurrency, ticket-in/ticket-out, using monetary value, etc.), multifactor authentication module 350 may be used to require various types of authentications (e.g., personal pin, password, biometric, audio and/or video associated with a user, token, public/private keys, etc.). This type of data may be further used during consensus evaluation to verify transactions (e.g., wagers) for modification of a blockchain ledger and/or access to player accounts (e.g., physical goods, virtual goods, skins, crates, digital tokens, digital cards, characters, etc.). Rules engine 325 can superimpose rules on the games or betting interfaces being presented on gaming clients 375. These rules can be based on various policies (e.g., subscriber policies, gambling policies, location policies, etc.) stored in database 365. Analytics module 335 can generate various analytics about layers, gaming clients, games, payouts, accounts, and/or other system components or activity. This information can be used by report generator 355 to create customized reports.

Event module 340 can be used to create customized rewards for players. The rewards may be stored within blockchain 370 in records 385. The games may be able to access these records (e.g., of the player, day, time, location, etc.) and present customized rewards or betting based on those records. Promotion module 345 can present customized promotions from the casino, nearby restaurants, shows, or other companies and/or products. Databases 360 and/or 365 can be used for storing logs, subscriber policies, gaming policies, location policies, access to records, retrieval of and/or the like. These may be local stores of data retrieved from records 385 associated with blockchain 370. In addition, gaming servers 305A-305N and blockchain 370 can connect with trusted data sources 380 for validation of external events (e.g., outcome of sporting events, etc.) that are needed to determine a winner of a customized bet stored within records 385.

Figure 4:
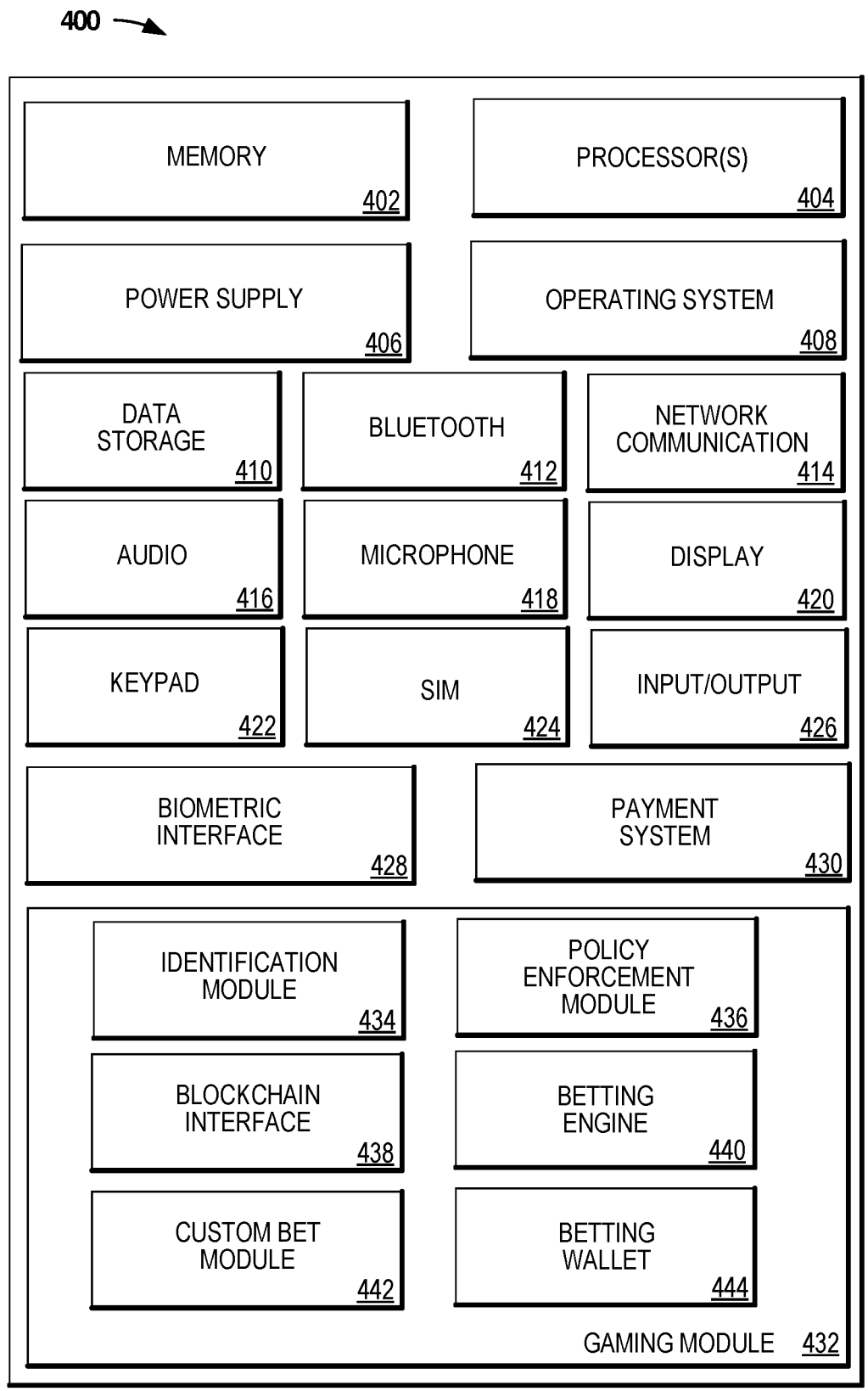
FIG. 4 illustrates an example of various components of a gaming client according to one or more embodiments of the present technology.

FIG. 4 illustrates an example of various components of a gaming client 400 according to one or more embodiments of the present technology. As shown in FIG. 4, gaming client 400 may include memory 402 (e.g., volatile memory and/or nonvolatile memory), processor(s) 404, power supply 406 (e.g., battery), for executing processing instructions, and operating system 408. In one example, a gaming client 400 may be a collection of components in a stand-alone computing device such as gaming terminal 110 (FIG. 1). In other examples, gaming client 400 may be a configuration of components operating as a gaming console (e.g., client gaming system), which may be utilized to access a gaming application/service over a network connection. In yet another example a gaming client 400 may interface with a client computing device such as a computer, tablet, smart phone, etc., whereby the client computing device may be adapted for execution of a gaming application/service so that processing operations described herein may be executed. In alternate examples, components of a gaming client 400 may interface in a distributed configuration, where components are connected over a network connection.

Additional components of gaming client 400 may include data storage component 410 (e.g., hard drive, flash memory, memory card, etc.), one or more network interfaces (e.g., Bluetooth® Interface 412; and Network Communication Interface 414, which enables the player's gaming terminal to communicate by transmitting and receiving wireless signals using licensed, semi-licensed or unlicensed spectrums over a telecommunications network), audio interface 416, microphone 418, display 420, keypad or keyboard 422, SIM card 424, other input and/or output interfaces 426, biometric interface 428 (e.g., fingerprint reader, facial recognition module, etc.), payment system 430, and gaming module 432. The various components may be interconnected via a bus.

Memory 402 can be any device, mechanism, or populated data structure used for storing information. In accordance with some embodiments of the present technology, memory 402 can encompass any type of, but is not limited to, volatile memory, nonvolatile memory and dynamic memory. For example, memory 402 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 402 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 402.

Memory 402 may be used to store instructions for running one or more applications or modules on processor(s) 404. For example, memory 402 could be used in one or more embodiments to house all or some of the instructions needed to execute the functionality of the various system components and/or modules. Processor(s) 404 are the main processors of gaming terminal 110 which may include application processors, baseband processors, various coprocessors, and other dedicated processors for operating gaming terminal 110. For example, an application processor can provide the processing power to support software applications, memory management, graphics processing, and multimedia. An application processor may be communicably coupled with memory 402 and configured to run the operating system 408, the user interface, and the applications stored on memory 402 or data storage component 410. A baseband processor may be configured to perform signal processing and implement/manage real-time radio transmission operations of a gaming terminal (e.g., a mobile device). These processors, along with the other components, may be powered by power supply 406. The volatile and nonvolatile memories found in various embodiments may include storage media for storing information such as processor-readable instructions, data structures, program modules, or other data. Some examples of information that may be stored include basic input/output systems (BIOS), operating systems, and applications.

Operating system 408 can also provide common services for software applications running on processor(s) 404. According to the embodiments shown in FIG. 4, gaming module 432 can include identification module 434, policy enforcement module 436, blockchain interface 438, betting engine 440, custom bet module 442, and/or betting wallet 444. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

For example, in one embodiment, identification module 434 and policy enforcement module 436 can be combined into a single module for identifying and enforcing various policies on a gaming terminal. As another example, some embodiments may include additional modules or components not illustrated in FIG. 4 such as, but not limited to, a skill level adjustment module, payout adjustment module (e.g., to dynamically adjust payment of a particular machine or game based on historical payouts, player skill level or other factors), accounting module (e.g., to interface with various existing backend accounting systems and other reporting and record keeping systems, such as an IRS reporting systems), and/or a state recordation module (e.g., to capture the state of a gaming activity such as, but not limited to, wager, payout levels, skill level settings, user interactions, and others activity).

Identification module 434 can be used to gather information about the player's gaming terminal, current and/or past gaming sessions, player information, specific hardware and software configurations of the gaming terminal, GPS coordinates, associated telephone numbers, IP addresses, e-mail addresses, user identifiers, international mobile station equipment identity (IMEI), mobile equipment identifiers (MEID), integrated circuit card identifiers (ICCID), part identifiers, software identifiers, current gaming session identifiers, identification of any nearby gaming terminals, and the like. In some embodiments, this information can be stored within the blockchain as a way of tracking user activity. In some embodiments, this information can be used by policy enforcement module 436 which can set customized collusion avoidance policies from that can, in some embodiments, be dynamically set (e.g., based on location, current gaming session, etc.). In some embodiments, policy enforcement module 436 can retrieve policies from a blockchain using blockchain interface 438 or from a database associated with a gaming server using network communication module 414.

In accordance with various embodiments, gaming module 432 can also include a betting engine 440 that allows the player to place bets. Betting engine 440 can restrict gambling in certain locations, ensure that requirements are met for placing bets, and/or other functions. In some embodiments, betting engine 440 may use custom bet module 442 to create customized bets between two or more players or between a player and the house. For example, custom bet module 442 could present a graphical user interface that allows users to create customized bets with specific betting amounts, conditions, validation sources, and the like. In one instance, the graphical user interface may be adapted to enable user to select a wager type (e.g., whether the wager is for currency, goods, virtual goods, skins, crates, digital tokens, barter, services, etc.) and/or wager amount. For instance, a user may elect to make a bet in a casino style game, bet on an occurrence of an event (or series of events) or individually define the terms associated with the bet. A user may initiate a customized bet on anything under the sun. In one example, a user may make a bet with his friend as to whether it will rain in a specific location on a given day.

Further, the graphical user interface may be adapted to enable users to set specific conditions or parameters associated with a bet. Non-limiting examples of conditions and parameters comprise but are not limited to: duration; user-defined conditions such as terms and restrictions for defining the scope of the bet; triggering events for determining an outcome of a bet; number of bets to be considered for a determined outcome; and associated physical, virtual and/or digital property associated with the bet such as player characters, attributes, rewards, virtual goods, etc., among other examples. Virtual goods comprise non-physical objects and currency, which are used in online communities and online games. Non-limiting examples of virtual goods comprise: characters; badges/icons; gameplay attributes; virtual money; cryptocurrencies; tokens; digital gifts; skins, crates, gameplay levels add-ons; and prizes, among other examples.

Betting wallet 444 can keep track of individual games played and bets made by a player. Betting wallet 444 may be associated with an individual user/player account or an account associated with a group of users/players. In some embodiments, collusion detection may be running during game play or upon completion of the gameplay before any winnings are paid out. The user can also customize the bet to define a validation source for validation of the outcome of a bet. In some cases, multiple validation sources may be utilized to confirm an outcome of a bet, where the user can define specific validation sources that they prefer to use or select to allow the gaming application/service to utilize its rule engine to automatically determine how to validate an outcome.

Figure 5:
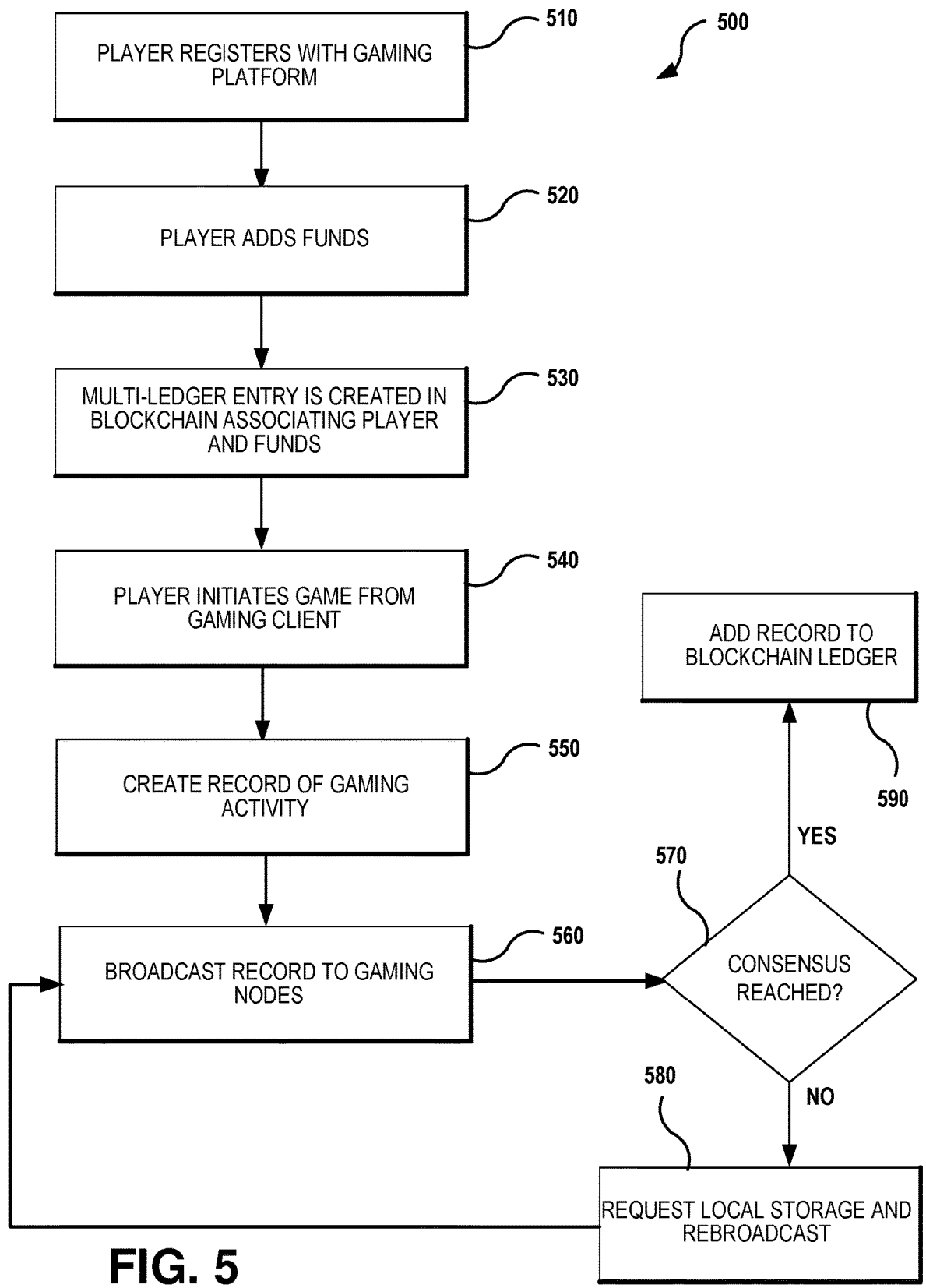
FIG. 5 illustrates an example of a set of operations for utilization of a distributed multi-ledger architecture for the management of gaming activity in accordance with some embodiments of the present technology.

FIG. 5 illustrates an example of a set of operations 500 (e.g., method) for utilization of a distributed multi-ledger architecture for the management of gaming activity in accordance with some embodiments of the present technology. As illustrated in FIG. 5, a player may register with a gaming platform, implementing a gaming application/service, using registration operation 510. In some embodiments, registration operation 510 may include presentation of a graphical user interface to collect information about the player. In other embodiments, the registration may allow the user to remain anonymous by issuing a private/public key pairing for which the public key is used by the gaming platform as a way tracking bets and gaming activity. As such, a player may desire to use one or more private/public key pairs for gambling activity on the system. Player registration with a gaming platform (operation 510) may comprise a user registering a user account with the gaming platform. Some users may be affiliated with multiple user accounts or a group account. A player may utilize their user account to execute bets for gameplay, bets with customized parameters and/or bets with one or more other users.

Using funding operation 520, a player can associate funds with the private/public key pairing created as part of the registration process. Entry operation 530 can then create an entry in the distributed multi-ledger system (e.g., blockchain) that associates the fund with the player. Using initiation operation 540, a player can initiate a game from a gaming client within initiation operation 540 and recordation operation 550 can create a record of the gaming activity to be stored in the multi-ledger system (e.g., blockchain). Creation of record 550 may comprise storing data, received through a graphical user interface of a gaming application/service, that is associated with the bet. Such data may include customized data as entered by the player including the selection of specific data fields of to customize the bet as well as possible entry of data fields that are customized by the user. For instance, the graphical user interface may be configured to enable a player to select a wager type field, a condition field, a parameter field and/or a validation source field, where the player can openly define the terms of the wager through its user input. Such data may be included in a block record of a blockchain. In some instances, a hash value for block may be determined from wager-specific data fields or other data fields (e.g., conditions, triggering event, validation sources) that are associated with the customized bet. A hash may further complete previous blocks, of a blockchain ledger, where creation (operation 550) of a record may associate a transaction for a customized bet with one or more other transactions as well as create a block a block for the transaction(s) from a previously created block of the blockchain ledger.

The record, created in operation 550, may further store other types of signal data associated with the customized bet including but not limited to: device signal data, application/service signal data and user-signal data, which may be further used to provide context associated with a customized bet. For instance, device signal data may be collected that indicates a GPS location or IP address associated with a player/user account that is making the customized bet or accepting terms of a customized bet initiated by another player. In other examples, biometric data, video or audio data may be collected, e.g., through the user computing device or peripheral devices in a location of the user, at the time where a betting transaction is being created or confirmed. Such data may be utilized to validate that a specific user is authorizing the customized bet as well as utilized in a consensus determination, by nodes, to validate a block of a blockchain ledger. In other instances, signal data associated with a user account, such as security questions, PIN numbers, etc., may be further utilized to validate or authenticate a transaction made by a player. Any signal data collected may be done so abiding with privacy regulations and with user consent.

The gaming terminal can broadcast the record to various gaming nodes for validations during broadcast operation 560. Broadcasting (operation 560) of the record may make the record available for validation, where gaming nodes may execute a determination as to whether the block, that comprises the transaction record for the customized bet, should be added to the blockchain ledger. Gaming nodes may be associated with a gaming platform, that executes a gaming application/service, where the gaming nodes connect to the gaming platform via network connection. Broadcasting (operation 560) of the record may further comprises randomly selecting a group of nodes to validate a created block for addition to the ledger. This may occur through execution of code associated with a blockchain protocol for the gaming platform. In some cases, gaming nodes may ping the gaming platform to indicate availability for validation of a block for addition to the ledger. A blockchain protocol, associated with the gaming platform, may select a plurality of gaming nodes to validate a block. In some instance, the blockchain protocol may call for selection of a group of gaming nodes, where an additional level of curation is executed on the selected group to determine a subset of multiple nodes to actually execute validation of a created block. This may help to ensure randomness in block validation and deter potentially fraudulent activity.

Flow of the set of operations may proceed to operation 570, where it is determined whether a consensus has been reached by the gaming nodes for adding the block to the ledger of the gaming platform. As indicated in the foregoing description, a blockchain protocol may be implemented to validate addition of a transaction to a distributed ledger (e.g., blockchain ledger) in a decentralized manner. As identified in the foregoing, a grouping of gaming nodes may be used to validate the block for addition to the ledger. The blockchain protocol may be implemented to request that the created record be validated via a consensus decision of the subset of the gaming nodes. A consensus determination is an agreement amongst a majority of gaming nodes (e.g., nodes that are selected for validation of the block), where at least a majority of the gaming nodes must agree that the block is valid for addition to the ledger of the gaming platform. A consensus determination is configured to ensure that blockchain ledgers are evaluated in a decentralized manner. The number of nodes that need to agree, for a consensus agreement, may be set by developers and defined through the blockchain protocol. In one instance, at least six (6) of the gaming nodes may be required to agree that a block is valid for addition to a ledger in order for a consensus to be reached. However, any number of nodes may be set for a consensus decision without departing from the spirit of the present disclosure.

A subset of the gaming nodes may be configured to individually executes code to reach the consensus decision. Consensus decisions may be reached through implementation of a proof algorithm. Non-limiting examples of proof algorithms, executed by the gaming nodes, may comprise but are not limited to: proof of work (PoW) algorithms; proof of stake (POS) algorithms; delegated PoS algorithms; proof of importance (PoI) algorithms; proof of activity (Poa) algorithms multi-signature/byzantine fault tolerance (BFT) algorithms; customized algorithms configured to validate data associated with transactions of the gaming platform (e.g., bets) and/or player account data, and any combination thereof. In one example, the consensus determination comprises validation of a cryptographic hash, associated with creation of the customized bet, by the subset of the multiple nodes. In one example, a hash of created block may be validated and/or hashes associated with previously created blocks. In another example, the consensus decision may comprise validation of a cryptographic puzzle associated with cryptographic hash. Difficulty in solving cryptographic puzzles may vary based on the amount of transactions (e.g., bets, fund transfers, etc.) being executed and the speed at which blocks are validated for addition to a ledger.

In further examples, the consensus decision comprises confirmation that the record of the customized bet has not already been added to the gaming platform (e.g., distributed multi-ledger platform). This may help to avoid having duplicates of a bet and/or fund transfer that may negatively affect operation of a gaming application/service. In additional examples, the consensus decision comprises validation of one or more of: biometric authentication of the player, authentication of image data associated with the player; authentication of video data associated with the player and authentication of audio data associated with the player. This may provide further measures of validation to confirm that a bet was validly made. Validation of additional measures may occur in addition to a cryptographic hash evaluation for a created block.

In examples where a consensus is achieved amongst the gaming nodes utilized for block validation, flow of the set of operations 500 may proceed to operation 590 where a record is added to the blockchain ledger. The record can include a variety of gaming and terminal characteristics (e.g., gaming terminal ID, gaming version number, etc.) along with betting amounts, images, videos, biometric validations, snapshots or records of the game, data or links to data from external sources (e.g., surveillance systems, loyalty tracking information, etc.). The recorded block may be used as a basis to add subsequent blocks to the ledger as well as for reference to validate transfer of funds based on a determined outcome of a bet.

When determination operation 570 determines that a consensus has not been reached, then determination operation 570 branches to request operation 580 that requests access to local storage and rebroadcasting of the record. In one example, a request for access and rebroadcasting may occur after a predetermined time period elapses before record data (e.g., of a block) is re-evaluated for validation.

For instance, operation 580 may comprise requesting a locally stored copy of the record to be rebroadcast for validation. A locally stored copy of the record may be retrieved from a gaming node that created the block. In some examples, a rebroadcasting (operation 580) comprises re-propagating the record to a new set of gaming nodes for executing a consensus determination. In another example, operation 580 comprises re-evaluating the block and associated data by the same set of gaming nodes. In yet another example, operation 580 comprises recreating a new block, where a transaction record is included in a new block that is subsequently evaluated (e.g., consensus decision determination; operation 570) for addition to a ledger.

Figure 6:
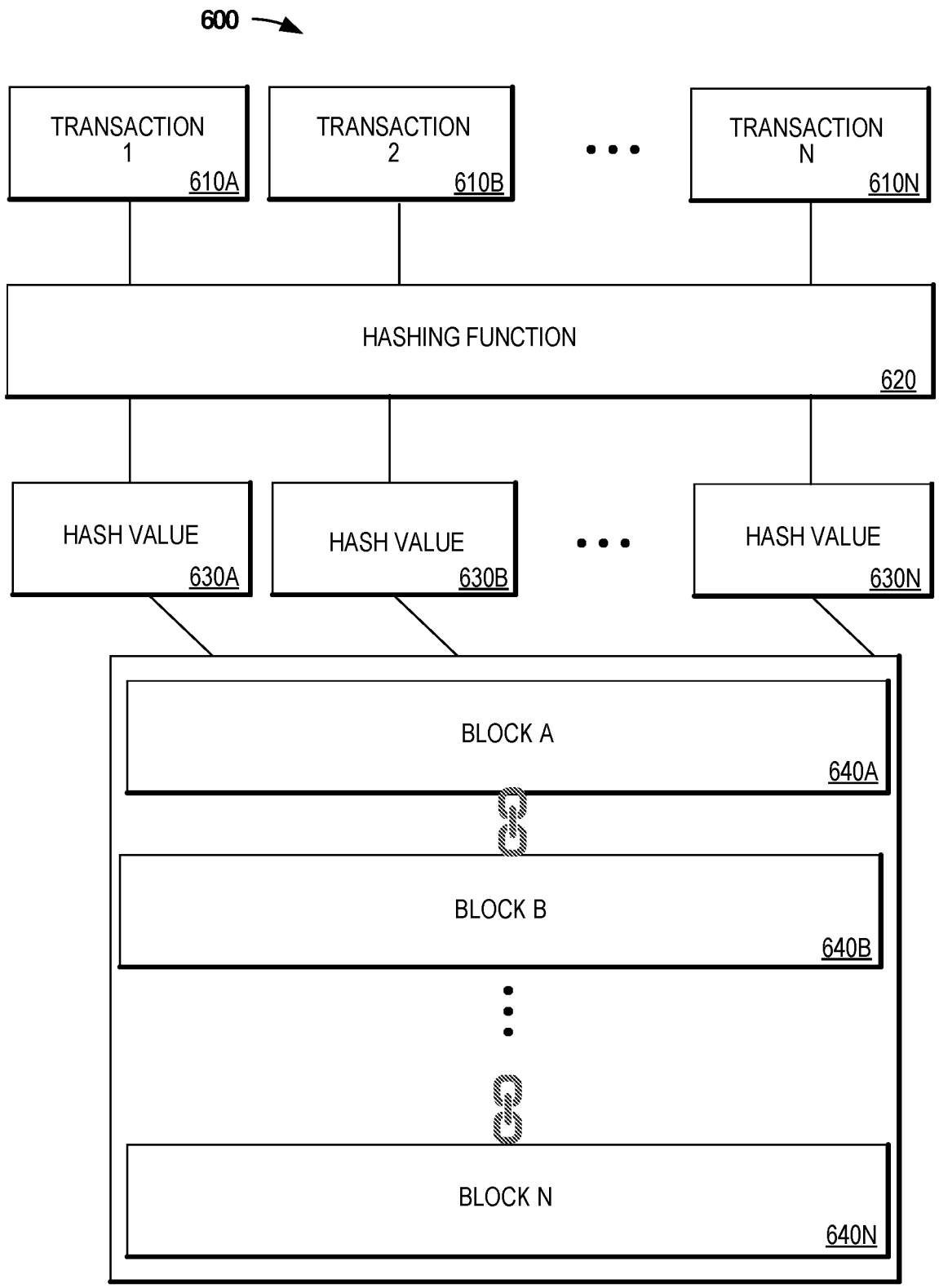
FIG. 6 illustrates an example of transaction recordation within a blockchain according to some embodiments of the present technology.

FIG. 6 illustrates an example of transaction recordation within a blockchain according to some embodiments of the present technology. As illustrated in FIG. 6, transactions 610A-610N are occurring at various gaming terminals. In accordance with various embodiments, a hash may be created for each entry in the ledger. For example, a SHA (Secure Hash Algorithm) may be used as a cryptographic hash function to create a one-way, (essentially) collision free signature of the entry. The SHA-256 algorithm generates 256-bit (32-byte) hash. Using hashing function 620, hashes are created of these transactions which are then added to blocks 640A-640N within the block chain. For example, the following entry may be made into the transaction ledger:

```
Transaction ID: 2017 Oct. 23-143856
Machine ID: 1010344568873NV
Loyalty ID: [bear37, 100898345]
Credits: [$188]
Bet: [$5, $10, $11]
Activity: [Lives: 2, Ammo: 45, Level: 3, Skill Level: 8]
```

The output of this entry from hashing function 620 that uses a SHA-256 hashing algorithm would be:
d36b1d6d72d324e476be798de120b25106f8cffbac3a00b1a6de43fa19d6c9f4

Figure 7:
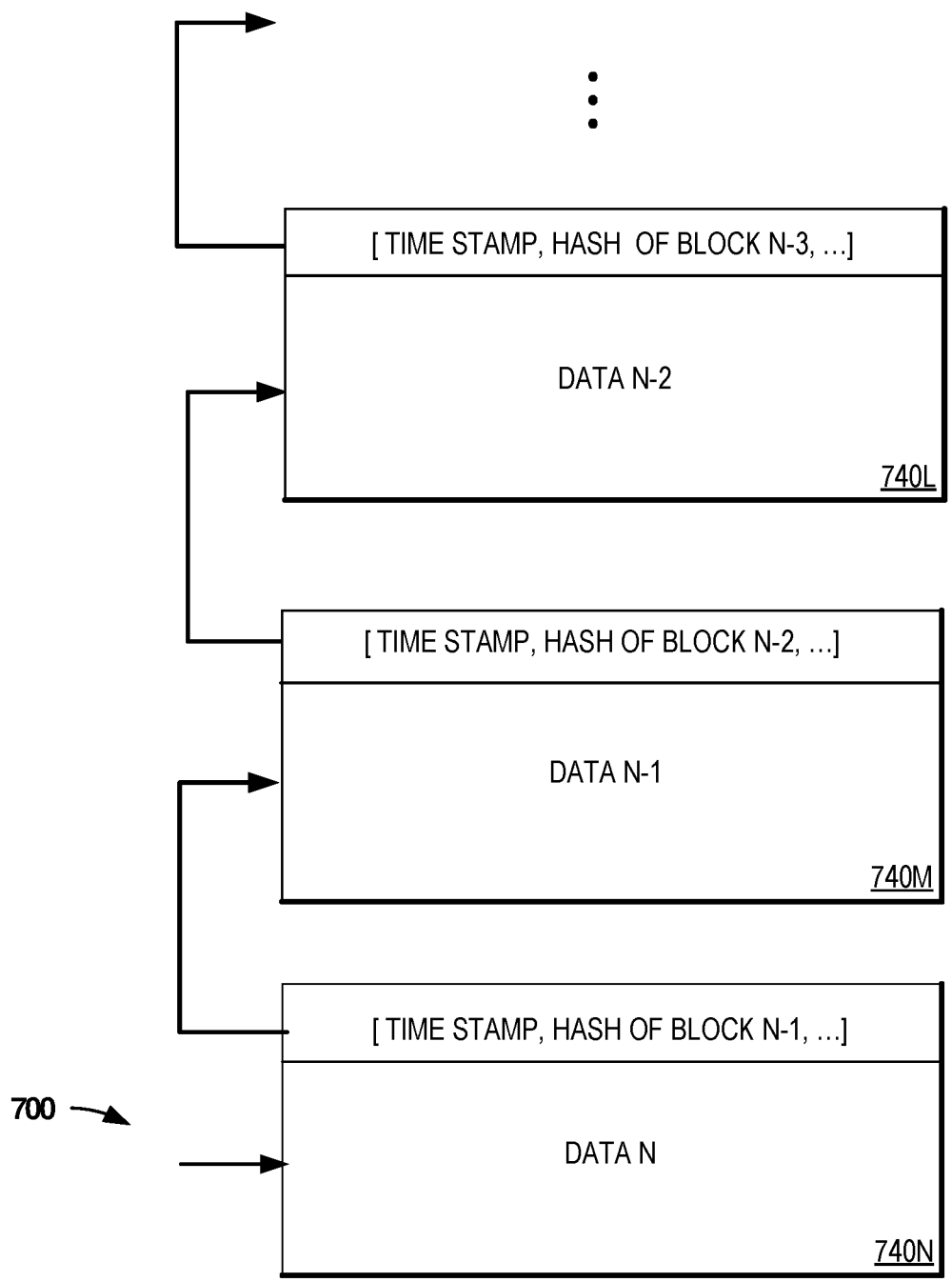
FIG. 7 illustrates an example of a tamper evident log that may be used in accordance with various embodiments of the present technology.

This hash value can then be incorporated within the immediately subsequent entry to effectively create a tamper proof system as illustrated in FIG. 7. FIG. 7 illustrates an example of a tamper evident log that may be used in accordance with various embodiments of the present technology. In some embodiments, the entry may also include additional information such as, but not limited to, cryptographic signatures, pointers (e.g., hash pointers) to previous transactions, GPS coordinates, telephone numbers, IP addresses, e-mail addresses, user identifiers, international mobile station equipment identity (IMEI), mobile equipment identifiers (MEID), integrated circuit card identifiers (IC-CID), part identifiers, software identifiers, current gaming session identifiers, identification of any nearby gaming terminals (i.e., other users), biometric data, recordings from surveillance systems, camera or video files, and the like. The first block in the chain can be referred to as the genesis block since this is the first record originating in the distributed ledger.

Figure 8A:
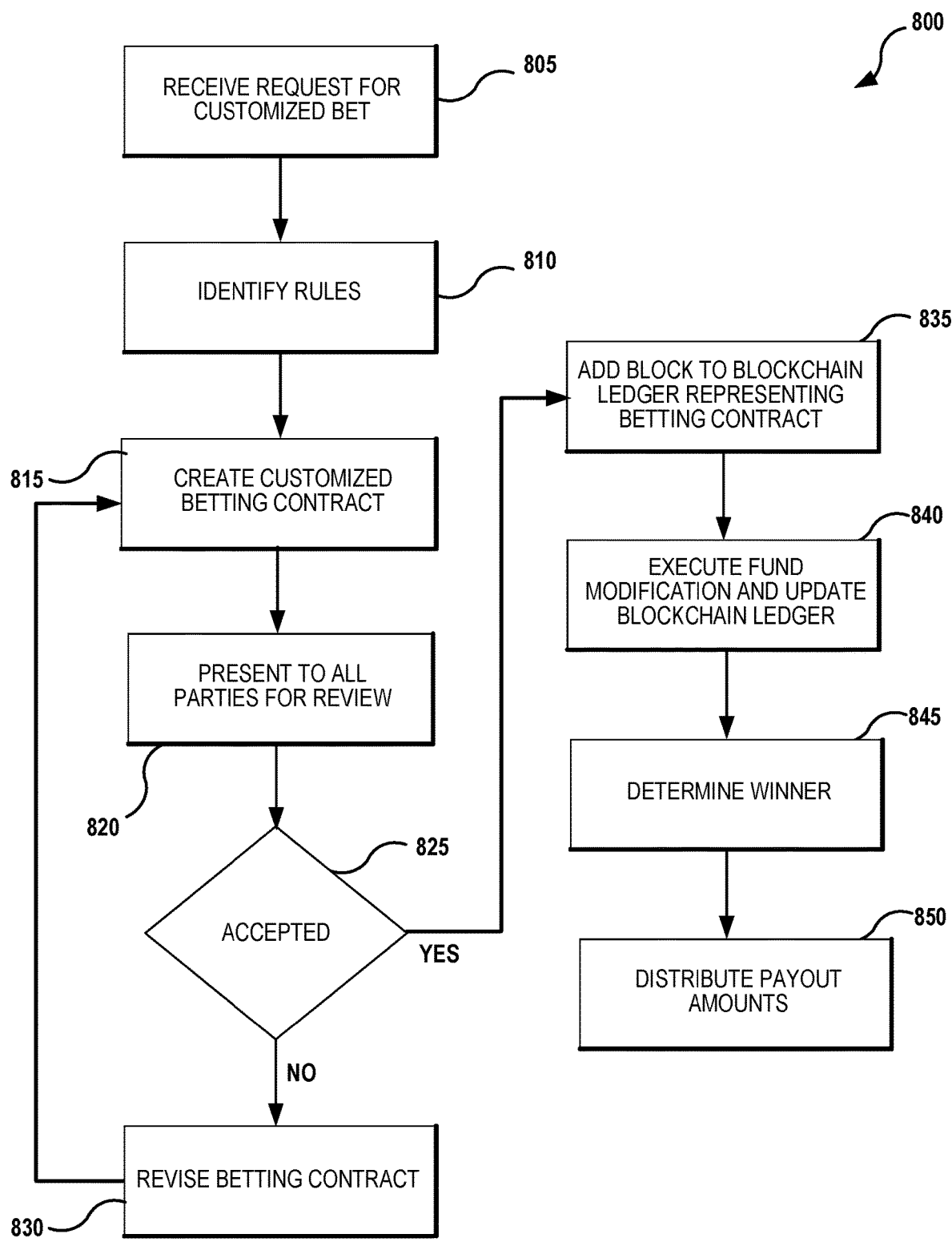
FIGS. 8A-8B illustrate examples of sets of operations for creation and management of customized bets in accordance with various embodiments of the present technology.

FIG. 8A illustrates an example of a set of operations 800 for creation and management of customized bets in accordance with various embodiments of the present technology. As illustrated in FIG. 8, a request to enter a customized bet can be received during receiving operation 805. Identification operation 810 can identify any rules or restrictions that need to be imposed. These rules and restrictions can be used in the creation of a customized betting contract by creation operation 815. Rules may be user-defined by players entering into a betting contract and/or defined by gaming platform. In some examples, rules may be specific to the type of bet and/or wager that is being executed.

The customized betting contract can be presented to all parties for review during presentation operation 820. When determination operation 825 determines that any one of the parties does not accept the contract, then determination operation 825 branches to creation operation 815 where the customized betting contract can be modified (operation 830). When determination operation 825 determines that all of the parties have accepted the contract, then determination operation 825 branches to addition operation 835 where a block is added to the blockchain ledger representing the betting contract. When a customized bet is created, e.g., by a player through a graphical user interface of the gaming application/service, processing to validate the betting transaction may be similar to what is described in the foregoing description (e.g., see description of FIGS. 5-7). For example, processing operations previously described may be utilized to create a block for addition to a blockchain ledger. A consensus decision, amongst gaming nodes, is executed to validate the addition of a block (that comprises data for the customized bet) to a blockchain ledger of the gaming platform. Once a block is validated for addition to the blockchain ledger, flow may proceed to operation 835, where a block, representing the betting contract, may be added to the blockchain ledger. As indicated in the foregoing description, a block comprises data for a betting contract but may also include data related to other betting contracts (e.g., created by players around the same time).

At operation 840, fund modification is executed based on the betting contract. For instance, player accounts (and any other affiliated accounts such as bank accounts) may be updated to hold wagered content, funds (e.g., currency, cryptocurrency), attributes, virtual goods, etc., while an executed betting contract is pending an outcome. As an example, a representation of the customized bet may be added to a mobile wallet capable of tracking customized bets. The mobile wallet may be a component of a gaming application/service or may be a third-party application/service that interfaces with a gaming application/service (e.g., through an application programming interface (API)). The representation includes a pointer to the record created for the customized bet in the gaming platform (e.g., distributed multi-ledger platform). In other examples, betting may occur with in-game virtual goods, where players may wager and risk virtual goods such as characters, attributes, badges, skins, crates, power-ups, affiliations, rank, etc.

The gaming platform may be configured to automatically execute code to determine an outcome of a betting contract. For instance, this may occur based on the occurrence of a triggering event. A triggering event may be specific data that, upon satisfaction, enables the outcome of a bet to be determined. In one example, a triggering event may include a specific date and time upon which an outcome of a bet is able to be verified. For instance, a bet may be made between two users over a football game that occurs on a specific date and time. However, triggering events are not limited to time-based examples. Triggering events may comprise any type of data, non-limiting examples of which comprise but are not limited to: date and/or time-specific data; keywords, conditions; earned achievements (during gamely—i.e., play to earn); and level of completion of a task/activity, among other examples. The gaming platform may implement one or more components for executing a verification engine that is configured to detect the occurrence of a triggering event as well as validate an outcome of a placed bet. For instance, the verification engine may execute pre-programmed code that is useful to access resources to evaluate parameters of a betting contract. As an example, the verification engine is configured to parse data associated with a record created for a bet. At a later point in time, the verification engine is further configured to execute processing operations to confirm an outcome of a bet through the validation sources identified in a betting contract. For instance, the verification engine is configured to confirm that conditions/parameters of the bet have been satisfied and further access one or more validation sources to verify the outcome of a bet. A result of that execution determines an outcome of the bet.

As referenced in the foregoing, more than one validation source may be utilized to verify a bet, where a consensus may be determined from a plurality of validation sources, leaving less likelihood that a determined outcome is incorrect. Determination of an outcome comprises determining a winner (operation 845) of the betting contract. In some alternative instances, it is determined that the conditions of the bet are not satisfied or there is no winner (e.g., a tie occurs). In such cases, a notification may be presented to the players indicating the outcome and any escrowed funds may be returned to the respective player accounts. In some embodiments, the determination operation 845 (used to determine a winner of a bet) may determine whether the game/bet is a player vs. machine, person vs. casino/bookmaker, person vs. person, tournament play, etc. Based on this information of the parties involved, different rules and/or regulations may apply. In addition, rake amounts, selection of payout currencies and/or prizes, bonus rounds, and the other events or charges may be based on the player configuration. In addition, this information indicates who will be responsible for the bet. For example, a determination can be made as to whether the casino/bookmaker is holding the bet or whether the bet is being held by a third party (e.g., in a peer to peer bet).

In examples where a winner is determined from a bet, payout amounts are distributed (operation 850) to the player account of the player who won the bet. Payout can occur with anything of value such as, but not limited to specific currencies (e.g., US dollars/money), crypto currencies such as Bitcoin, virtual currencies, physical prizes, virtual goods, skins, and the like. Player accounts may be automatically updated in response to determination of an outcome of a bet.

Example 1—Sports Bet

Example would be Jordan and Jason bet on the Super Bowl. Jason chooses Miami Dolphins and Jordan chooses Denver Broncos to win. The contract would be in place holding the money. Automatically, at end of Super Bowl whoever the determined winner would be paid per the instructions of the smart contract. The smart contract processes the bet and returns the win directly to winner's wallet. This bet can be on a public or private blockchain and is verified code, that lives on the very public/private blockchain.

Example 2—Game of Chance Random Bet

Example would be if a player bets on different games such as roulette or craps where an algorithm is used. If In a game of craps player bets on snake eyes (each dice lands on one) than the contract would pay based on odds of 30:1 so if player bet $5 on snake eyes and the dice landed on snake eyes the player would get paid $150. The distributed ledger would show the bet made, odds on bet, what occurred when dice algorithmically where thrown (end result) and win/loss and credit to wallet or credit to casino.

Example 3—Prediction Bet

Example would be betting on who will be the next President of the United States, who will win American Idol or some other sort of social, political or economic event that will occur in the future. If Jason bets that Mark Cuban will be the next President of the United States and Jordan chooses the next President will be Steve Bannon both of which running on the Republican ticket than odds are established for reach bet. The casino or bookmaker who took the bet would establish odds based on a future event and its outcome. If Jason is correct than his money would be automatically transferred to his wallet. If Jordan was correct than his bet would automatically be transferred to his wallet. The bookmaker would hold the money bet by both Jordan and Jason. Their wallet would be ultimately responsible for payout which would occur automatically. Now if the bet was made peer to peer or between Jordan and Jason directly than whoever wins the bet would automatically have that money bet sent to their respective wallet. If for example Steve Bannon does not run for president than Jordan would automatically lose as Steve Bannon never ran in the first place.

Figure 8B:
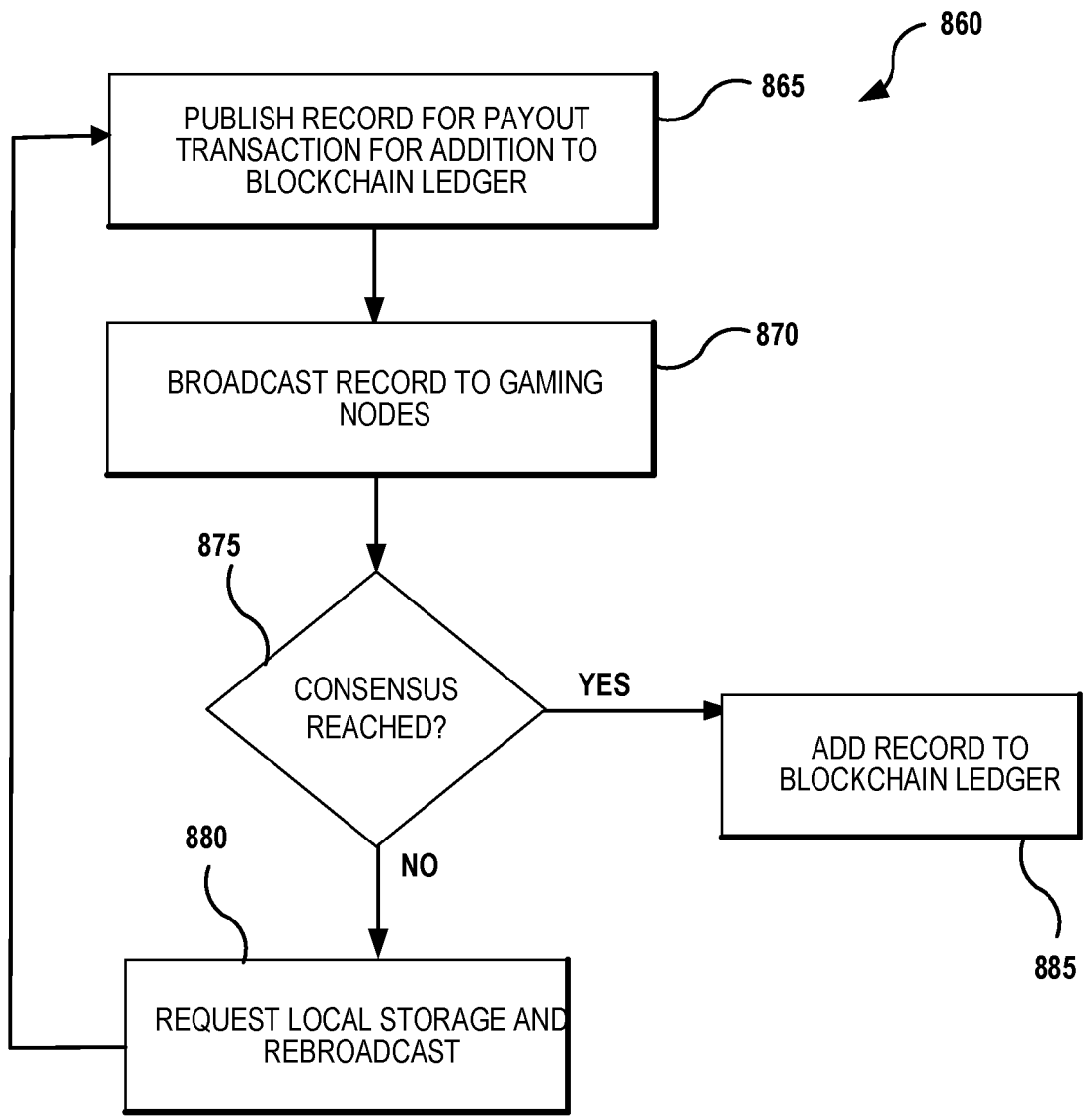

FIG. 8B illustrates a continued example of a set of operations 860 for creation and management of customized bets in accordance with various embodiments of the present technology. FIG. 8B provides operations that may follow distribution of a payout amount (operation 850 of FIG. 8A). Similar to instances where a record of a customized bet is created and added to a blockchain ledger, additional transactional records may be created and added, to a blockchain ledger, when an outcome of a bet is determined, and payout issued.

At operation 865, a record for a payout transaction is published for addition to a blockchain ledger. Record creation, such as creation of a block for a blockchain ledger, and publication of records have been described in the foregoing description. The published record may be broadcast (operation 870) to gaming nodes for validation as to whether to add the record to the blockchain ledger. For instance, a block that comprises the transaction record for payout may be created and published for validation. A consensus determination (determination operation 875) may be executed by a subset of gaming nodes to determine whether to add the block to the blockchain ledger. Examples of consensus determination processing has been provided in the foregoing description. In examples where the block is not validated, flow of determination operation 875 branches NO and the set of operations 860 proceeds to operation 880. At operation 880, a request is made to a local storage to rebroadcast receive the created record, where the created record is rebroadcast, from a gaming node that created the record, to other gaming nodes for execution of a consensus determination. In some alternative examples, a record for a payout transaction is re-created as there may have been an error in generation of a block that comprises the payout transaction. Flow of the set of operations 860 may then return to operation 865, where the record is re-published or recreated. In examples where a consensus determination validates a block that comprises the record of the payout transaction, determination operation 875 branches YES and processing of the set of operation 860 proceeds to operation 885. At operation 885, the record (e.g., block) of the payout transaction is added to the blockchain ledger.

FIG. 9 illustrates a non-limiting example 900 of information that may be recorded in a multi-ledger system in accordance with one or more embodiments of the present technology. Blockchain technology allows a network of computers to agree at regular intervals on the true state of a distributed ledger. Multiple different ledgers may be kept, based on various purposed. FIG. 9 represents one example 900, where information such as transaction identifiers, payer identifiers, betting amounts, location identifiers, payout amounts, and other information (e.g., executable code) can be stored. The blockchain may use hashing algorithms (e.g., SHA 256) along with random number generators and other technology to secure the ledger. As identified in the foregoing description, a ledger may further comprise additional fields (not shown) that relate to customized parameters associated with a specific bet.

Figure 10:
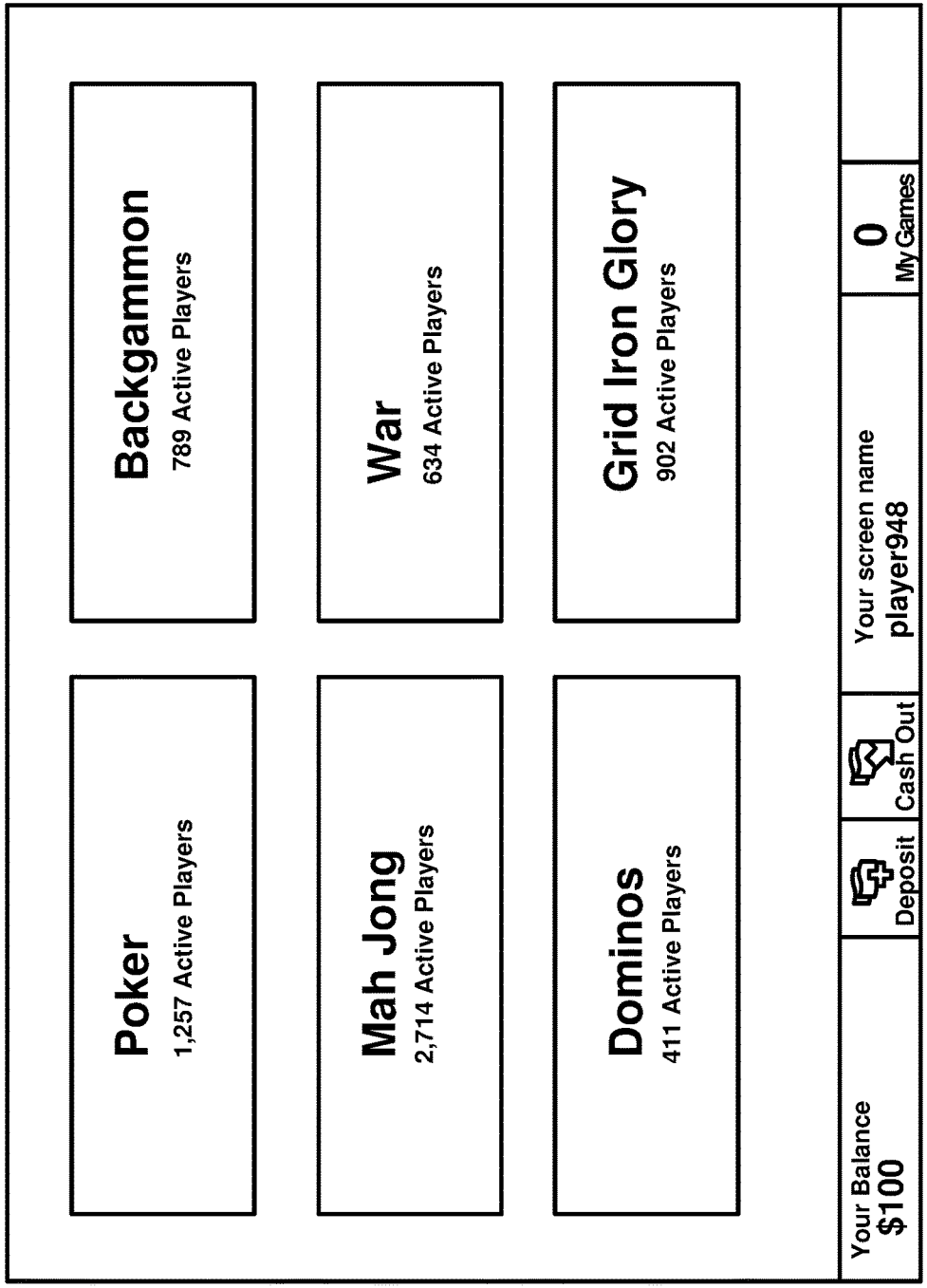
FIG. 10 illustrates an example of a graphical user interface that may be used for selecting games in accordance with some embodiments of the present technology.

FIG. 10 illustrates a non-limiting example of a graphical user interface 1000 displayed on a gaming terminal in the form of a wireless mobile device (e.g., smartphone) that may be used for selecting games in accordance with some embodiments of the present technology. Some embodiments of the present technology can utilize graphical user interface 1000 to access games and to perform system level functions such as deposits and cash-outs. Through the client device, the graphical user interface 1000 can provide a visually consistent, intuitive and flexible framework for delivering a full gamut of gaming experiences. Client navigation can be based on an easily traversable hierarchy: a player selects a game, is taken to that game's lobby, and then chooses a table, match or tournament. Interface queues including transition animations and sounds help players move effortlessly through the navigational structure. As illustrated in FIG. 10, graphical user interface 1000 provides quick access to an extensible menu of games. Each game link can display real-time information about the game such as active players, tables and tournaments. Some embodiments may include a custom bet link that facilitates the creation of customized bets that can be stored in the ledger as a smart contract between a player and another party (e.g., the casino, another player, sports book, etc.).

FIG. 11 illustrates a non-limiting example of a graphical user interface 1100 that may be used for selecting options to identify suitable games in accordance with various embodiments of the present technology. The graphical user interface 1100 shown in FIG. 11 can display game lobbies including sort and filter functions. A quick-seat tool can let players quickly find a suitable seat in table based games by using a 2-4 step wizard-style process. At the operator's discretion games can be enabled for simultaneous multi-game play and can support wait-listing. Some embodiments provide for seamless transition between multiple games including alert and auto-switch features that notify a player when action is required or automatically brings a game that needs attention to the forefront. Some embodiments use vector based graphics technology resulting in minimal file sizes and an interface that can scale smoothly to a wide range of resolutions. Some client devices can support raster graphics including embedded and streaming video. Colors, fonts, background images and even sounds (e.g., within Arrow Client) can be customized for (or by) an operator or even for a given machine or bank of machines.

Figure 12:
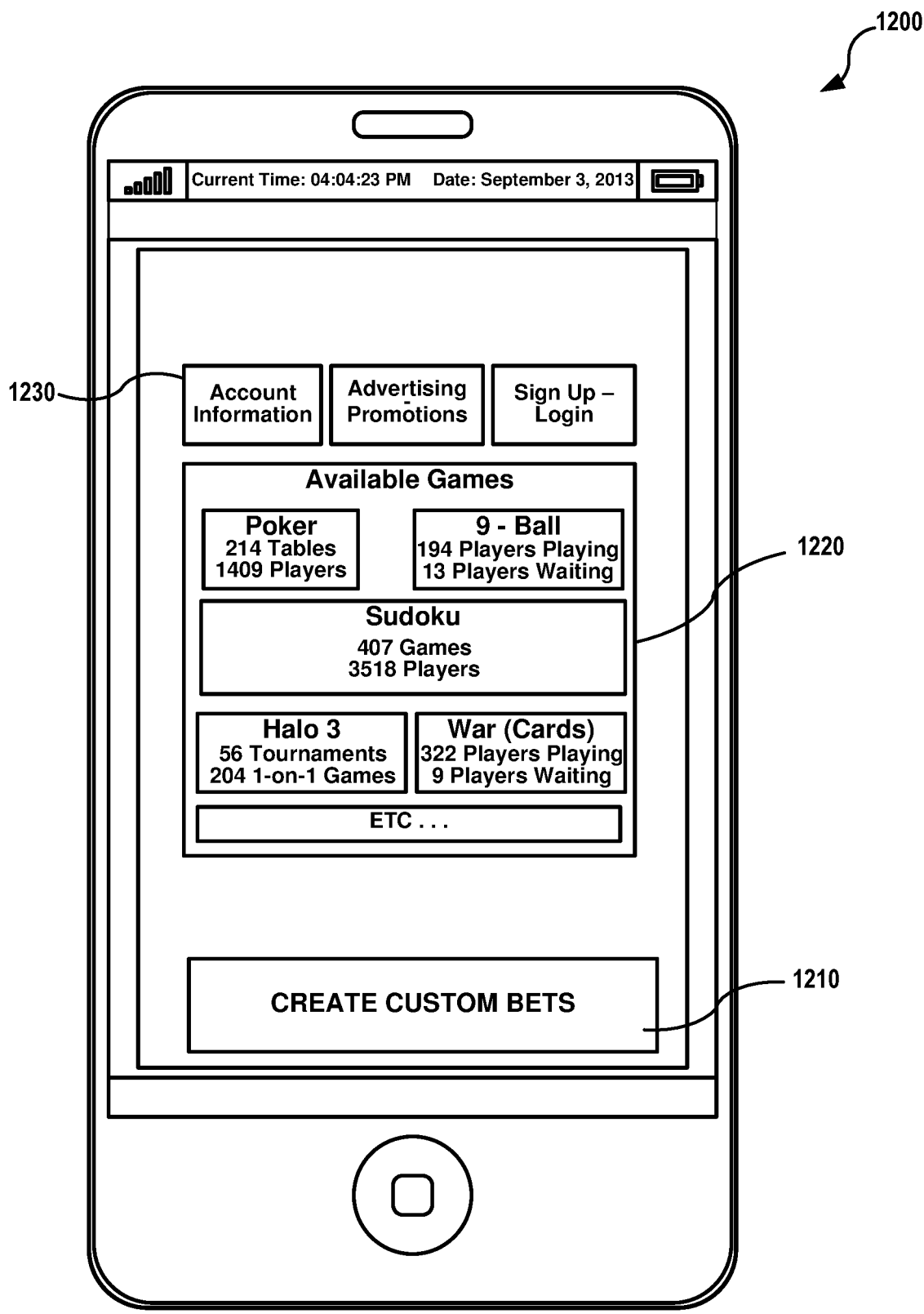
FIG. 12 illustrates an example of a graphical user interface for showing available games in accordance with one or more embodiments of the present technology.

FIG. 12 illustrates a non-limiting example of a graphical user interface 1200 for showing available games in accordance with one or more embodiments of the present technology. Graphical user interface 1200 shows a main display of an adapted user interface that enables players to create customized bets (e.g., user interface element 1210) through a gaming platform. A player may select user interface element 1210 to initiate creation of a customized bet, which may prompt the player with an additional user interface screen to enter customized parameters associated with bet creation. A non-limiting example of another user interface screen for entering customized bets is provided in FIG. 14. Graphical user interface 1200 further comprises a user interface element for available game selection 1220. The user interface element for available game selection 1220 is configured to display available games that the user can access through a gaming platform. The graphical user interface 1200 may update the user interface element for available game selection 1220, for example, to display games that the player has shown a preference for and/or rotating display of games to identify new games for the player. Additionally, the graphical user interface 1200 may comprise additional user interface elements such as gaming management user interface elements 1230. Gaming management user interface elements may comprise user interface features that enable a user to directly access specific features such as: login/sign-in, account information, advertising and promotions, betting history; and access to a digital wallet, among other examples.

FIG. 13 illustrates various examples of graphical user interfaces 1300 showing lobbies for various games according to some embodiments of the present technology. The examples shown in FIG. 13 are non-limiting examples of lobbies for specific types of games such as poker, 9-ball and Sudoku. However, similar types of game lobbies may be created for any game offered through a gaming platform. Example game lobbies may comprise data for categorized levels of gaming for a specific type of game (e.g., low and high stakes poker). Specific data related to a level of gaming (e.g., selected table or match through a gaming lobby) may be identified in transactional data that is used to create a record of player activity, bets, wagers, etc. Such data may be identified in transactional record that is included in a block, which is added to a blockchain ledger.

Figure 14:
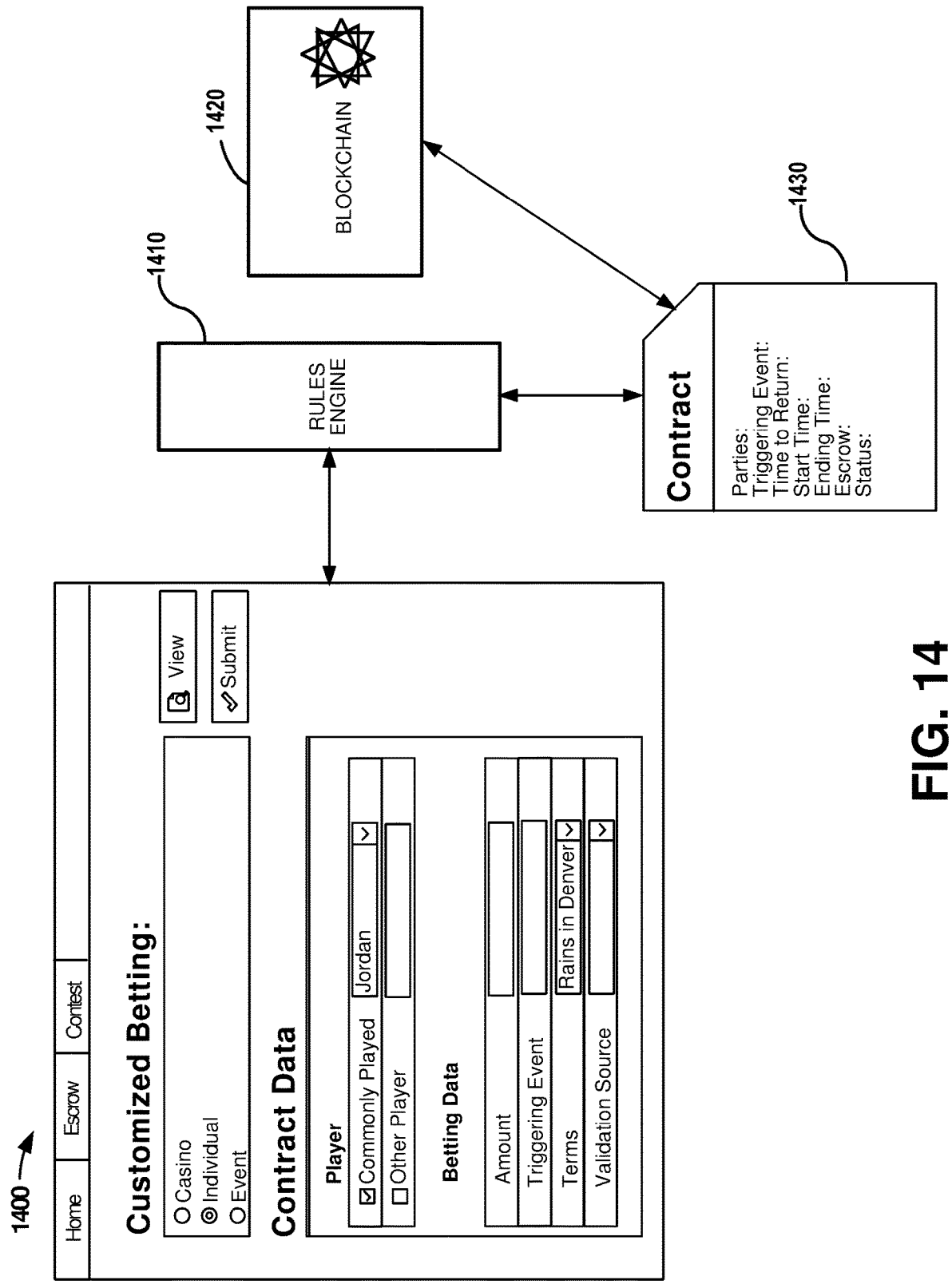
FIG. 14 illustrates an example of a graphical user interface and system for creating customized bets that may be stored and automatically executed within a distributed multi-ledger system according to various embodiments of the present technology.

FIG. 14 illustrates an example of a graphical user interface 1400 and system for creating customized bets that may be stored and automatically executed within a distributed multi-ledger system according to various embodiments of the present technology. As illustrated in FIG. 14, a user can access a custom betting interface (e.g., via a gaming terminal, such as a mobile phone, smart television, etc.) and create a custom bet. The bet may be with the casino, another individual, an event, or other party. Once selected, the player can enter specific customizable information for the bet. For example, the player may select to create a sports bet with another player on whether an NFL team will win the super bowl in a particular year (e.g., 2020). As another example, a player can create a $100 customized bet on a specific video game (e.g., Pac-Man) either with another player or to beat a particular score (e.g., a one-time score, an average score over a day, week, or month, etc.). The game can be played (e.g., on a casino gaming terminal or personal user device) and the score set by the player can be recorded to a blockchain 1420. In some cases, the same random number or other gaming parameters can be stored in the blockchain 1420 and retrieved so that the players are truly playing the same game. The competing player can play and the corresponding score can be recorded and a winner determined.

In some embodiments, a bet could be cancelled, etc. One or more validation sources can be selected which will be used to verify the results. A rules engine 1410, interfaces with a gaming platform and a blockchain protocol, that is used for generation of blockchain 1420. The rules engine 1410 comprises one or more components (e.g., hardware, software or a combination thereof) that ensures that the customized bet is legal and in compliance with any rules or regulations. The rules engine 1410 is further configured to execute processing operations that translate the customized bet into a contract 1430 (e.g., smart contract), which can be stored on as one or more blocks of a blockchain 1420. The betting amounts can be placed in escrow, where funds may be removed from a digital wallet of a player while a bet is pending. There could be multiple places or source that confirm the wager. The rules engine 1410 may further be configured to provide trust levels or rankings so that those validation sources with a higher ranking would agree in view of a conflict. Other embodiments may use a majority rule, additional verification, or submission to a human for resolution. One benefit of this type of various embodiments is that no intermediary is needed. Instead, some embodiments allow for customized creation, tracking and payout bets without a third-party human. Key data that is selected and agreed to between parties can be automatically verified and tracked. A customized betting contract can be created and stored in a blockchain based on events at a specific time and date and who won or lost determines the payout. For sweepstakes or tournament, there could be a lot of winners. For example, everybody participant could pay $100 entry fee and only the top ten will get paid. Results can be put on block chain 1420 so everyone can see how they score. An exemplary contract 1430 may comprise transactional data for a customized bet including but not limited to: the parties (e.g., player accounts associated with a bet), triggering event(s), timestamp data, escrow data, status, conditions; and number of bets and associated terms (e.g., parlay bet), among other examples.

Exemplary Computer System Overview

Aspects and implementations of the gaming system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, cloud-based gaming platform or other computing device) programmed with the instructions to perform the steps or operations. For example, the steps or operations may be performed by a combination of hardware, software, and/or firmware.

Figure 15:
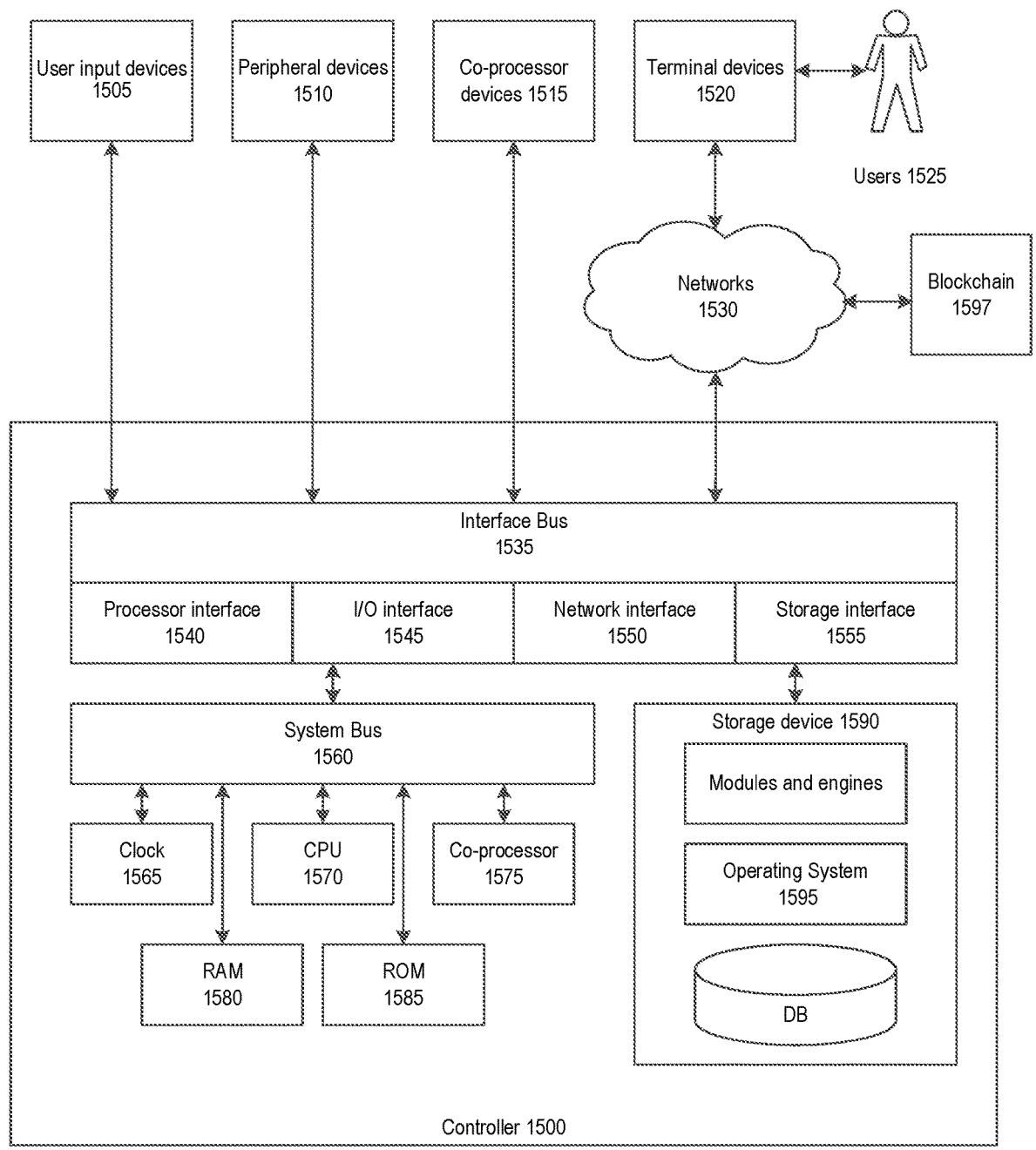
FIG. 15 illustrates an example of a computing platform that may be used in accordance with some embodiments of the present technology.

FIG. 15 is a block diagram illustrating an example machine representing the computer systemization of the host computer system. The gaming controller 1500 may be in communication with entities including one or more users 1525 client/terminal devices 1520 (e.g., gaming terminals 110 as described in FIGS. 1 and 12), user input devices 1505, peripheral devices 1510, optional co-processor device(s) (e.g., cryptographic processor devices) 1515, and networks 1530. Users may engage with the gaming controller 1500 via terminal devices 1520 over networks 1530. In some embodiments, all or a portion of the communications between terminal devices 1520 and gaming controller 1500 can be encrypted. Various laws, standards, or best practices may require cryptography for storing, transmitting, and/or utilization of various types data, information, code, signaling, etc.

Computers may employ central processing units (CPUs) or processors to process information. Processors may include programmable general-purpose or special-purpose microprocessors, programmable controllers, application-specific integrated circuits (ASICs), programmable logic devices (PLDs), embedded components, a combination of such devices and the like. Processors execute program components in response to user and/or system-generated requests. One or more of these components may be implemented in software, hardware or both hardware and software. Processors pass instructions (e.g., operational and data instructions) to enable various operations.

The gaming controller 1500 may include clock 1565, CPU 1570, memory such as read only memory (ROM) 1585 and random-access memory (RAM) 1580 and co-processor 1575 among others. These controller components may be connected to a system bus 1560, and through the system bus 1560 to an interface bus 1535. Further, user input devices 1505, peripheral devices 1510, co-processor devices 1515, and the like, may be connected through the interface bus 1535 to the system bus 1560. The interface bus 1535 may be connected to a number of interface adapters such as processor interface 1540, input output interfaces (I/O) 1545, network interfaces 1550, storage interfaces 1555, and the like.

Processor interface 1540 may facilitate communication between co-processor devices 1515 and co-processor 1575. In one implementation, processor interface 1540 may expedite encryption and decryption of requests or data. Input output interfaces (I/O) 1545 facilitate communication between user input devices 1505, peripheral devices 1510, co-processor devices 1515, and/or the like and components of gaming controller 1500 using protocols such as those for handling audio, data, video interface, wireless transceivers, or the like (e.g., Bluetooth®, IEEE 894a-b, serial, universal serial bus (USB), Digital Visual Interface (DVI), 802.11a/b/g/n/x, cellular, etc.). Network interfaces 1550 may be in communication with the network 1530. Through the network 1530, gaming controller 1500 may be accessible to remote terminal devices 1520 (e.g., gaming terminals 110 illustrated in FIGS. 1 and 12). Network interfaces 1550 may use various wired and wireless connection protocols such as, direct connect, Ethernet, wireless connection such as IEEE 802.11a-x, miracast and the like. Some components of the interactive gaming system may include various protocols or comply with various standards or certifications set forth by different associations or regulatory agencies. For example, some embodiments may use the slot accounting system (SAS) protocol or comply with the game to system (G2S) standard.

Examples of network 1530 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1550 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1555 may be in communication with a number of storage devices such as, storage devices 1590, removable disc devices, and the like. The storage interfaces 1555 may use various connection protocols such as Serial Advanced Technology Attachment (SATA), IEEE 894, Ethernet, Fiber, Universal Serial Bus (USB), and the like. A storage system/device may be a component of a computing system that is executed processing operations as described herein or alternatively connecting/interfacing with a computing system via cabled or wireless network connection. An example storage system may comprise volatile and nonvolatile, removable and non-removable media implemented in any method or technology for storage of information, such as computer readable instructions, data structures, program modules, cache memory or other data. Storage systems/devices may be configured to store computer-readable storage media. Examples of computer-readable storage media include but are not limited to: random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage media a propagated signal.

In addition to computer readable-storage media, in some implementations storage devices may also include computer readable communication media over which at least some software may be communicated internally or externally. Storage systems may be implemented as a single storage device but may also be implemented across multiple storage devices or sub-systems co-located or distributed relative to each other. Storage systems may comprise additional elements, such as a controller, capable of communicating with processing systems or possibly other systems. Software may be implemented in program instructions and among other functions may, when executed by processing systems (e.g., processors, computing devices). For example, software may include program instructions for implementing processing operations described herein related to gaming application/service execution and management including: customized betting/wager management; blockchain ledger management; management of gaming nodes and player accounts; and virtual good creation, tracking and management, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software may include additional processes, programs, or components, such as operating system software, virtual machine software, or other application software. Software may also comprise firmware or some other form of machine-readable processing instructions executable by processing system. In general, software may, when loaded into processing system and executed, transform a suitable apparatus, system, or device overall from a general-purpose computing system into a special-purpose computing system customized to process data and respond to queries. Indeed, encoding software on a storage system may transform the physical structure of storage system. The specific transformation of the physical structure may depend on various factors in different implementations of this description. Examples of such factors may include, but are not limited to, the technology used to implement a computer-readable storage media and whether the computer-readable storage media are characterized as primary or secondary storage, as well as other factors.

User input devices 1505 and peripheral devices 1510 may be connected to I/O interface 1545 and potentially other interfaces, buses and/or components. User input devices 1505 may include card readers, finger print readers, joysticks, keyboards, microphones, mouse, remote controls, retina readers, touch screens, sensors, and/or the like. Peripheral devices 1510 may include antenna, audio devices (e.g., microphone, speakers, etc.), cameras, external processors, communication devices, radio frequency identifiers (RFIDs), scanners, printers, storage devices, transceivers, and/or the like. Co-processor devices 1515 may be connected to the controller 1500 through interface bus 1535, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1500 may employ various forms of memory including on-chip CPU memory (e.g., registers), RAM 1580, ROM 1585, and storage devices 1590. Storage devices 1590 may employ any number of tangible, non-transitory storage devices or systems such as fixed or removable magnetic disk drive, an optical drive, solid state memory devices and other processor-readable storage media. Computer-executable instructions stored in the memory may include an interactive gaming platform having one or more program modules such as routines, programs, objects, components, data structures, and so on that perform particular tasks or implement particular abstract data types. For example, the memory may contain operating system (OS) component 1595, modules and other components, database tables, and the like. These modules/components may be stored and accessed from the storage devices, including from external storage devices accessible through an interface bus 1535.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The gaming controller 1500 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the gaming controller 1500 may be distributed electronically over the Internet or over other networks (including wireless networks). Those skilled in the relevant art(s) will recognize that portions of the interactive gaming system may reside on a server computer, while corresponding portions reside on a client computer. Data structures and transmission of data particular to aspects of the gaming controller 1500 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

Having described several embodiments, it will be recognized by those of skill in the art that various modifications, alternative constructions, and equivalents may be used without departing from the spirit of the technology. Additionally, a number of well-known processes and elements have not been described in order to avoid unnecessarily obscuring the present technology. Accordingly, the above description should not be taken as limiting the scope of the technology, which is defined in the following claims.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method utilizing blockchain resources to record and manage gaming related data generated in association with an electronic gaming service, comprising:

receiving within a gaming platform a customized gaming contract including at least one wager generated via a graphical user interface presented to a player on a display of a gaming terminal, wherein the customized gaming contract includes identifiers including an identity of at least one player party of the customized gaming contract a location of the gaming terminal, and at least one condition for determining a winner of the customized gaming contract;

the gaming platform generating a record of the customized gaming contract that includes the identifiers;

the gaming platform publishing the record of the customized gaming contract to a distributed multi-ledger platform having multiple nodes, wherein a determination is made, based on a decision from a subset of the multiple nodes based on the identifiers, to add the record to the distributed multi-ledger platform;

at least one of the gaming platform or the distributed multi-ledger platform determining an outcome of the customized gaming contract by verifying the at least one condition for determining a winner; and at least one of the gaming platform or the distributed multi-ledger platform directing a payout to the player based on the at least one wager if the at least one condition for determining a winner is verified.

2. The method of claim 1, wherein the customized gaming contract further includes an identifier for one or more validation sources used to verify the at least one condition for determining a winner, and wherein:

generating the record of the customized gaming contract includes generating the record of the customized gaming contract that further includes an identifier for one or more validation sources used to determine the winner; and determining the outcome of the customized gaming contract includes automatically determining the outcome of the customized betting contract by verifying the at least one condition for determining a winner against the one or more validation sources.

3. The method of claim 2, wherein the one or more validation sources include a trusted data source for validation of external events, and wherein automatically determining the outcome of the customized gaming contract includes connecting with the trusted data source to determine the winner.

4. The method of claim 1, wherein the customized gaming contract further includes one or more wagering amounts and one or more host transaction or processing fees for the one or more wagering amounts, and wherein generating the record of the customized gaming contract includes generating the record of the customized betting contract that further includes the one or more host transaction or processing fees for the one or more wagering amounts.

5. The method of claim 4, further comprising debiting one or more host transaction or processing fees from the one or more wagering amounts after the at least one of the gaming platform or the distributed multi-ledger platform determines the outcome of the customized betting contract by verifying the at least one condition for determining a winner.

6. The method of claim 1, wherein determining an outcome of the customized gaming contract includes determining an identity of at least one winning player party to the customized gaming contract meeting the at least one condition for determining a winner.

7. The method of claim 6, further comprising updating the record of the customized gaming contract published to the distributed multi-ledger platform with the identifier of the at least one winning player party.

8. The method of claim 1, wherein the customized betting contract further includes with the identifiers an identification of the at least one wager included in a form of at least one of: cryptocurrency, digital currency, physical currency, skins, virtual goods, digital goods, physical goods, crates, digital trading crates, services, barter, rewards, clues, power-ups, points, game-specific points videos, character modifications, character recordings, collectibles, unique prizes.

9. The method of claim 1, wherein the customized betting contract further includes with the identifiers an identification of the at least one wager in the form of at least one of: bets, money transfers, game play data, loyalty information, avatars, bots, game states, jackpot amounts.

10. The method of claim 1, wherein determining an outcome of the customized gaming contract is triggered by a triggering event including at least one of: a date and time upon which an outcome of a bet is to be verified, a date and time upon which an outcome of a bet is to be verified, keywords, conditions, earned achievements, a level of completion of a task, a level of completion of an activity.

11. The method of claim 1, further comprising a step of distributing a payout amount to a player account associated with the winner after the outcome of the customized gaming contract is determined by verification that the at least one condition for determining a winner is met.

12. A method for creating and executing gaming transactions through an electronic gaming service, the method comprising:

receiving within a gaming platform a request for a customized wager generated via a graphical user interface presented to a player on a display of a gaming terminal, wherein the request for the customized wager includes identifiers including an identity of the player, a location of the gaming terminal, and an identification of at least one wager including at least one of: cryptocurrency, digital currency, physical currency, skins, virtual goods, digital goods, physical goods, crates, digital trading crates, services, barter, rewards, clues, power-ups, points, game-specific points videos, character modifications, character recordings, collectibles, unique prizes;

the gaming platform generating a record of the customized wager that includes an identification of the at least one wager;

the gaming platform broadcasting the record of the customized wager to a subset of nodes of a distributed multi-ledger platform having multiple nodes for authentication of the request for the customized wager according to the identifiers and a gaming policy; and the gaming platform publishing the record of the customized wager to the distributed multi-ledger platform in response to the request for the customized wager meeting the gaming policy.

13. The method of claim 12, wherein the request for the customized wager includes an identification of a funding source for the at least one wager and the method further comprises the step of debiting the funding source after publishing the record of the customized wager to the distributed multi-ledger platform.

14. The method of claim 12, further comprising granting access to a third party to read records of one or more gambling transactions associated with a published record of the customized wager from the distributed multi-ledger platform.

15. The method of claim 14, wherein the third party includes to at least one of: auditors, tax authorities, and regulatory authorities.

16. The method of claim 12, further comprising at least one of the gaming platform or the distributed multi-ledger platform determining an outcome of the customized wager by verifying the at least one condition for determining a winner.

17. The method of claim 16, wherein the customized wager further includes an identifier for one or more validation sources used to verify the at least one condition for determining a winner.

18. The method of claim 17, wherein generating the record of the customized wager includes generating the record of the customized wager with an identifier for the one or more validation sources used to determine the winner.

19. The method of claim 18, wherein determining the outcome of the customized wager includes automatically verifying the at least one condition for determining a winner against the one or more validation sources.

20. An electronic gaming system utilizing blockchain resources to record and manage gaming related data generated in association with an electronic gaming service provided by the electronic gaming system, comprising:

a communications interface;

one or more processor operatively coupled to the communications interface and configured to:

receive player registration data for a player account of the electronic gaming service via a graphical user interface presented to the player on a display of a gaming terminal, wherein the player registration data includes identifiers of the player, a location of the gaming terminal, and a wager including at least one of: cryptocurrency, digital currency, physical currency, skins, virtual goods, digital goods, physical goods, crates, digital trading crates, services, barter, rewards, clues, power-ups, points, game-specific points videos, character modifications, character recordings, collectibles, unique prizes;

generate a record of the player registration data;

publish the record of the player registration data to a distributed multi-ledger platform having multiple nodes;

receive a request for a game transaction from the player, wherein the game transaction includes one or more of accessing a game, accessing the wager, and placing bets on the game using the wager;

generate a record of the request for the game transaction;

broadcast the record of the request for the game transaction to a subset of the multiple nodes for authentication of the request for the game transaction, wherein a determination is made, based on a decision from the subset of the multiple nodes according to analysis of the identifiers and a gaming policy, to add a record of the game transaction to the distributed multi-ledger platform; and publish the record of the game transaction to the distributed multi-ledger platform.

\* \* \* \* \*